(12) United States Patent
McKenzie et al.

(10) Patent No.: US 10,989,512 B2
(45) Date of Patent: Apr. 27, 2021

(54) MEASURING TAPE WITH IMPROVED STANDOUT

(71) Applicant: APEX BRANDS, INC., Apex, NC (US)

(72) Inventors: Timothy T. McKenzie, Westminster, MD (US); Eric Broadway, New Freedom, PA (US); Vlad Petru Patrangenaru, Ellicott City, MD (US)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 16/650,533

(22) PCT Filed: Sep. 26, 2018

(86) PCT No.: PCT/US2018/052814
§ 371 (c)(1),
(2) Date: Mar. 25, 2020

(87) PCT Pub. No.: WO2019/067515
PCT Pub. Date: Apr. 4, 2019

(65) Prior Publication Data
US 2020/0278189 A1    Sep. 3, 2020

Related U.S. Application Data

(60) Provisional application No. 62/645,647, filed on Mar. 20, 2018, provisional application No. 62/563,343, filed on Sep. 26, 2017.

(51) Int. Cl.
*G01B 3/10* (2020.01)
*G01B 3/1003* (2020.01)
(Continued)

(52) U.S. Cl.
CPC ............. *G01B 3/1003* (2020.01); *B24C 1/10* (2013.01); *B24C 3/12* (2013.01); *G01B 3/1056* (2013.01); *G01B 2003/1058* (2013.01)

(58) Field of Classification Search
CPC ........................... G01B 3/1003; G01B 3/1056
(Continued)

(56) References Cited

U.S. PATENT DOCUMENTS 3,073,022 A    1/1963  Bush et al.
3,482,423 A   12/1969  Murray et al.
(Continued)

OTHER PUBLICATIONS

International Seach Report and Written Opinion of international application No. PCT/US2018/052814 dated Dec. 4, 2018, all enclosed pages cited.

*Primary Examiner* — George B Bennett
(74) *Attorney, Agent, or Firm* — Burr & Forman, LLP

(57) ABSTRACT

A blade for a measuring tape device may include a first end configured to extend from a housing of the measuring tape device through an aperture, a second end configured to be wound on a reel assembly within the housing, and a first cupped portion having a first amount of cupping over a selected portion of a longitudinal length of the blade. The first cupped portion may be defined by a curved portion extending from an apex of the curved portion toward lateral edges of the blade, and wings extending from each of the lateral edges toward the curved portion on each side of the apex. The curved portion includes a first radius proximate to the apex of the curved portion, and a second radius at a point spaced apart from the apex on both sides of the apex, the second radius being different than the first radius.

10 Claims, 21 Drawing Sheets

(51) Int. Cl.
*B24C 1/10* (2006.01)
*B24C 3/12* (2006.01)
*G01B 3/1056* (2020.01)

(58) Field of Classification Search
USPC .................................................. 33/757, 771
See application file for complete search history.

(56) References Cited

U.S. PATENT DOCUMENTS

| | | | |
|---|---|---|---|
| 4,429,462 A | 2/1984 | Rutty et al. | |
| 5,791,009 A | 8/1998 | McComber et al. | |
| 6,324,769 B1 * | 12/2001 | Murray | G01B 3/1003 |
| | | | 33/755 |
| 6,367,161 B1 * | 4/2002 | Murray | G01B 3/1003 |
| | | | 33/757 |
| 6,410,884 B1 | 6/2002 | Hackel et al. | |
| 6,651,354 B1 * | 11/2003 | Odachowski | G01B 3/1041 |
| | | | 33/755 |
| 6,662,463 B2 * | 12/2003 | Lee | G01B 3/1003 |
| | | | 33/757 |
| 6,907,676 B2 * | 6/2005 | Liao | G01B 3/1003 |
| | | | 33/757 |
| 6,959,500 B2 * | 11/2005 | Liao | G01B 3/1003 |
| | | | 33/757 |
| 7,096,596 B2 * | 8/2006 | Hernandez, Jr. | G01B 3/1003 |
| | | | 33/755 |
| 7,395,608 B2 * | 7/2008 | Liao | G01B 3/1003 |
| | | | 33/757 |
| D785,475 S * | 5/2017 | Graykowski | G01B 3/1056 |
| | | | D10/72 |
| D785,476 S * | 5/2017 | Graykowski | G01B 3/1056 |
| | | | D10/72 |
| 10,126,107 B2 * | 11/2018 | Khangar | G01B 3/1056 |
| 2008/0010884 A1 | 1/2008 | Liao | |

* cited by examiner

FIG. 7A

| | Sample No. | Weight (lb) Housing | Weight (lb) Tape | Weight (lb) Hook | Weight (lb) Total | Width (in.) | Curve height (in.) | Ratio of standout to flat width | Standout (in.) | THK. W/paint (in.) | Bare Sil. THK. (in.) |
|---|---|---|---|---|---|---|---|---|---|---|---|
| Untreated tape 1-25' | L1 | 0.498 | 0.458 | 0.018 | 0.978 | 1.172 | 0.3252 | 101.1092 | 118.5 | 0.0072 | 0.0047 |
| Treated tape 1-25' | L1B | 0.498 | 0.458 | 0.018 | 0.978 | 1.172 | 0.3626 | 120.3072 | 141 | | 0.0047 |
| Untreated tape 2-25' | L2 | 0.634 | 0.462 | 0.022 | 1.116 | 1.180 | 0.2958 | 98.3051 | 116 | 0.0056 | 0.0045 |
| Treated tape 2-25' | L2B | 0.634 | 0.462 | 0.022 | 1.116 | 1.180 | 0.3396 | 116.1017 | 137 | | 0.0045 |
| Comparison tape 1-26'/8M | 1 | 0.644 | 0.626 | 0.018 | 1.288 | 1.250 | 0.3504 | 116.0000 | 145 | 0.0076 | 0.0053 |
| | 2 | | | | | | | | | | |
| | 3 | | | | | | | | | | |
| | 4 | | | | | | | | | | |
| Comparison tape 2-25' | 1 | 0.626 | 0.626 | 0.014 | 1.266 | 1.250 | 0.3349 | 106.4000 | 133 | 0.0094 | 0.0053 |
| | 2 | | | | | | | | | | |
| | 3 | | | | | | | | | | |
| | 4 | | | | | | | | | | |
| Comparison tape 3-25' | 1 | 0.568 | 0.596 | 0.014 | 1.178 | 1.250 | 0.3067 | 105.6000 | 132 | 0.0074 | 0.0053 |
| | 2 | | | | | | | | | | |
| | 3 | | | | | | | | | | |
| | 4 | | | | | | | | | | |

| Top painting removed (in.) | Bot. Paint removed (in.) | Force to collapse inverted "U" tape shape flat to the table surface. Tape shape collapse force at: (LB). dist. noted is from hook end. | | | Collapse force estimated by FEA |
| --- | --- | --- | --- | --- | --- |
| | | 1 FT | 6 FT | Standout dist. | Standout dist. |
| 0.0059 | 0.0064 | 3.80 | 4.11 | 6.56 | 6.77 |
| | | | | 8.61 | 9.58 |
| 0.0050 | 0.0048 | 5.05 | 5.62 | 5.73 | 5.77 |
| | | | | 6.78 | 7.45 |
| 0.0068 | 0.0068 | 4.46 | 6.96 | 10.15 | 10.40 |
| 0.0073 | 0.0076 | 4.94 | 6.89 | | |
| | | 4.59 | 7.05 | 9.13 | 9.42 |
| | | 4.10 | 6.81 | | |
| 0.0066 | 0.0066 | 4.11 | 5.61 | 8.23 | 8.48 |
| | | 4.36 | 5.64 | | |

FIG. 7B

| Model | Width at Max Standout | Variance to Tape 1 | Height at Max Standout | Variance to Tape 1 | Width to Height Ratio | Bottom Radius | Variance to Tape 1 | Secondary Radius | Tertiary Radius | "Wing" Length | Variance to Tape 1 | Thickness | Variance to Tape 1 |
|---|---|---|---|---|---|---|---|---|---|---|---|---|---|
| Tape 1 | 0.8116 | N/A | 0.3626 | N/A | 2.2383 | 0.3730 | N/A | 0.4003 | N/A | 0.1355 | N/A | 0.0045 | N/A |
| Tape 2 | 0.8871 | 0.0755 | 0.3396 | 0.023 | 2.6122 | 0.4312 | 0.0582 | 0.3427 | 1.0927 | 0.1006 | 0.0349 | 0.0047 | |
| Comparison Tape 1 | 0.9557 | 0.1441 | 0.3504 | 0.0122 | 2.7275 | 0.4537 | 0.0807 | N/A | N/A | 0.1822 | 0.0467 | | |
| Comparison Tape 2 | 0.9853 | 0.1737 | 0.3349 | 0.0277 | 2.9421 | 0.4828 | 0.1098 | N/A | N/A | 0.1774 | 0.0419 | | |
| Comparison Tape 3 | 1.0437 | 0.2321 | 0.3067 | 0.0559 | 3.4030 | 0.4983 | 0.1253 | N/A | N/A | 0.2464 | 0.1109 | | |

(Units for all measurements are inches)

(Units for all measurements are inches)

(Units for all measurements are inches)

(Units for all measurements are inches)

(Units for all measurements are inches)

(Units for all measurements are inches)

(Units for all measurements are inches)

(Units for all measurements are inches)

(Units for all measurements are inches)

FIG. 26A.

| testpoint | Sample 1 | | | |
|---|---|---|---|---|
| | chord length | brace height | steel strip thickness | paint thickness |
| 5ft | 1.0315 | 0.2406 | 0.004 | 0.0014 |
| 7ft | 0.915 | 0.3248 | | |
| 9ft | 0.8977 | 0.3347 | | |
| 11ft | 0.9004 | 0.3307 | | |
| 13ft | 0.9079 | 0.3268 | | |
| 15ft | 0.9182 | 0.3209 | | |
| 17ft | 0.8847 | 0.3449 | | |
| | ↑ 991 | ↑ 993 | ↑ 995 | ↑ 997 ↑ 999 |

FIG. 26B.

| testpoint | Sample 2 | | | |
|---|---|---|---|---|
| | chord length | brace height | steel strip thickness | paint thickness |
| 5ft | 1.0378 | 0.239 | 0.004 | 0.0014 |
| 7ft | 0.8819 | 0.3367 | | |
| 9ft | 0.9004 | 0.3331 | | |
| 11ft | 0.9008 | 0.328 | | |
| 13ft | 0.9056 | 0.3335 | | |
| 15ft | 0.8945 | 0.3465 | | |
| 17ft | 0.9134 | 0.3241 | | |
| | ↑ 991 | ↑ 993 | ↑ 995 | ↑ 997 ↑ 999 |

FIG. 26C.

| testpoint | Sample 3 | | | |
|---|---|---|---|---|
| | chord length | brace height | steel strip thickness | paint thickness |
| 5ft | 1.0213 | 0.2323 | 0.004 | 0.0014 |
| 7ft | 0.9016 | 0.3307 | | |
| 9ft | 0.9197 | 0.3205 | | |
| 11ft | 0.9323 | 0.3134 | | |
| 13ft | 0.9213 | 0.3209 | | |
| 15ft | 0.9146 | 0.3189 | | |
| 17ft | 0.876 | 0.3504 | | |
| | ↑ 991 | ↑ 993 | ↑ 995 | ↑ 997 ↑ 999 |

MEASURING TAPE WITH IMPROVED STANDOUT

CROSS REFERENCE TO RELATED APPLICATIONS

This application claims priority to U.S. application Ser. Nos. 62/563,343 filed Sep. 26, 2017 and 62/645,647 filed Mar. 20, 2018, the entire contents of each of which are hereby incorporated by reference in their entirety.

TECHNICAL FIELD

Example embodiments generally relate to measuring tape devices, and particularly relate to a measuring tape that has increased standout.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between an a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For relatively short measuring tapes (e.g., 12 ft or 25 ft), self-retracting mechanisms are very common. For very long measuring tapes (e.g., larger than 100 ft), a manual retracting mechanism is typically employed.

For nearly a century, metallic tape ribbons with a curved (or cupped) and relatively stiff construction have been preferred for use in self-retracting measuring tapes. The metallic tape ribbon tends to be flexible enough to permit the metallic tape ribbon to be wound onto a spring loaded reel assembly, but stiff enough to have a relatively long standout. The cupping of the metallic tape ribbon further enhances the standout without negatively impacting the ability of the metallic tape ribbon to be wound onto the reel assembly. By employing an end hook at one end of the tape, the user may take advantage of the standout to pay out the measuring tape toward an anchor point on a medium that is to be measured and then conduct the measurement without having to physically move to the anchor point to affix the end hook and then move away to make the measurement. Given the time and energy that can be saved by this method of measurement, taking advantage of the standout characteristics of a self-retracting measuring tape is a very popular feature. So much so, in fact, that it is not uncommon to see a user make multiple attempts to utilize standout and catch a remote end of media being measured with the end hook, rather than simply moving to the remote end of the media to manually fix the end hook to the remote end. When the standout is poor, and the user has to use multiple attempts, or fails and must resort to moving to the remote end to affix the end hook, frustration may grow, and the user may seek out a measuring tape with better standout characteristics.

Invariably, each measuring tape will have a certain length that effectively defines the maximum standout that can be achieved before the tape bends and basically collapses. The measuring tape can no longer be extended reliably toward the anchor point once this collapse occurs. However, as noted above, many users would prefer to reattempt to affix the anchor point without moving, sometimes numerous times, than to physically move to the anchor point and attach the end hook to the anchor point. Thus, having a superior standout could be a powerfully attractive feature for a measuring tape.

BRIEF SUMMARY OF SOME EXAMPLES

Some example embodiments may enable the provision of a longer than normal standout for a measuring tape by providing unique geometric characteristics to at least a segment of a blade portion of the measuring tape. Thus, for example, user experience associated with use of the measuring tape (and standout) may be improved.

In an example embodiment, a measuring tape device is provided. The measuring tape device may include a housing having an aperture, a reel assembly, and a blade. The blade may include a first end configured to extend from the housing through the aperture, a second end configured to be wound on the reel assembly, and a first cupped portion having a first amount of cupping over a selected portion of a longitudinal length of the blade. The first cupped portion may be defined by a curved portion extending from an apex of the curved portion toward lateral edges of the blade, and wings extending from each of the lateral edges toward the curved portion on each side of the apex. The curved portion includes a first radius proximate to the apex of the curved portion, and a second radius at a point spaced apart from the apex on both sides of the apex, the second radius being different than the first radius.

In another example embodiment, a blade for a measuring tape device is provided. The blade may include a first end configured to extend from a housing of the measuring tape device through an aperture, a second end configured to be wound on a reel assembly within the housing, and a first cupped portion having a first amount of cupping over a selected portion of a longitudinal length of the blade. The first cupped portion may be defined by a curved portion extending from an apex of the curved portion toward lateral edges of the blade, and wings extending from each of the lateral edges toward the curved portion on each side of the apex. The curved portion includes a first radius proximate to the apex of the curved portion, and a second radius at a point spaced apart from the apex on both sides of the apex, the second radius being different than the first radius.

In another example embodiment, a blade for a measuring tape device is provided. The blade may include a first end configured to extend from a housing of the measuring tape device through an aperture, a second end configured to be wound on a reel assembly within the housing, and a first cupped portion having a first amount of cupping over a selected portion of a longitudinal length of the blade. The first cupped portion may be defined by a curved portion extending from an apex of the curved portion toward lateral edges of the blade, and wings extending from each of the lateral edges toward the curved portion on each side of the apex. The curved portion includes a radius proximate to the apex of the curved portion, and a length of the radius increases as distance from the apex increases on both sides of the apex.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 8:
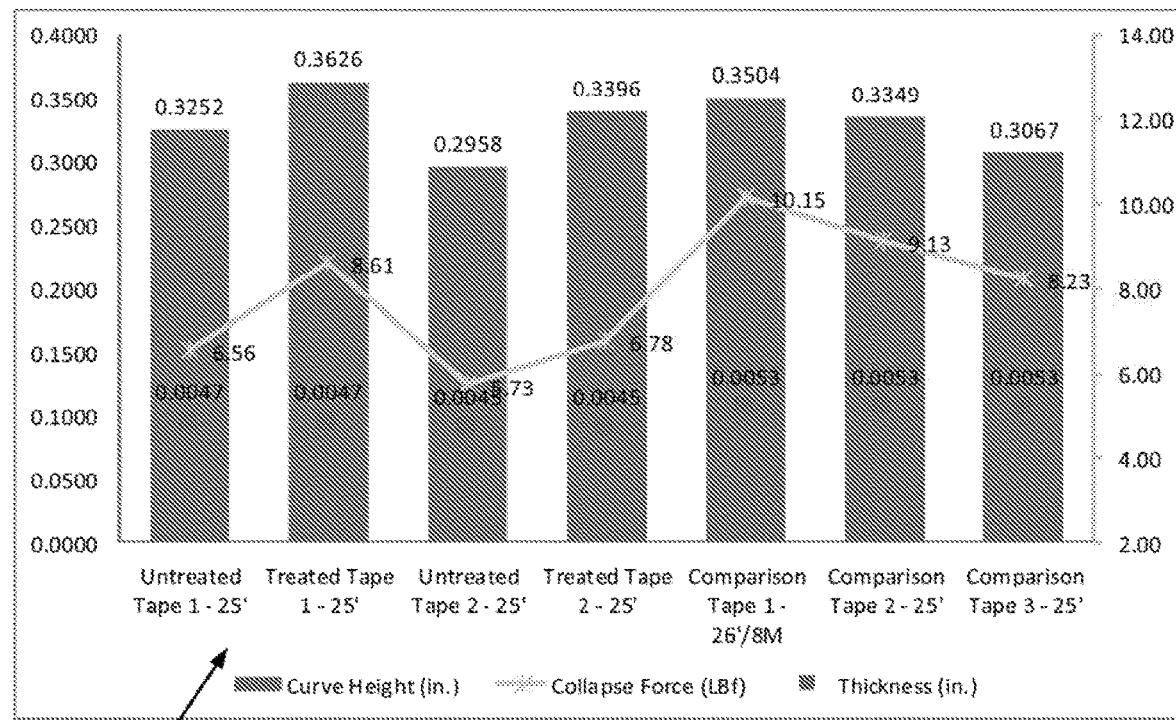
Figure 9:
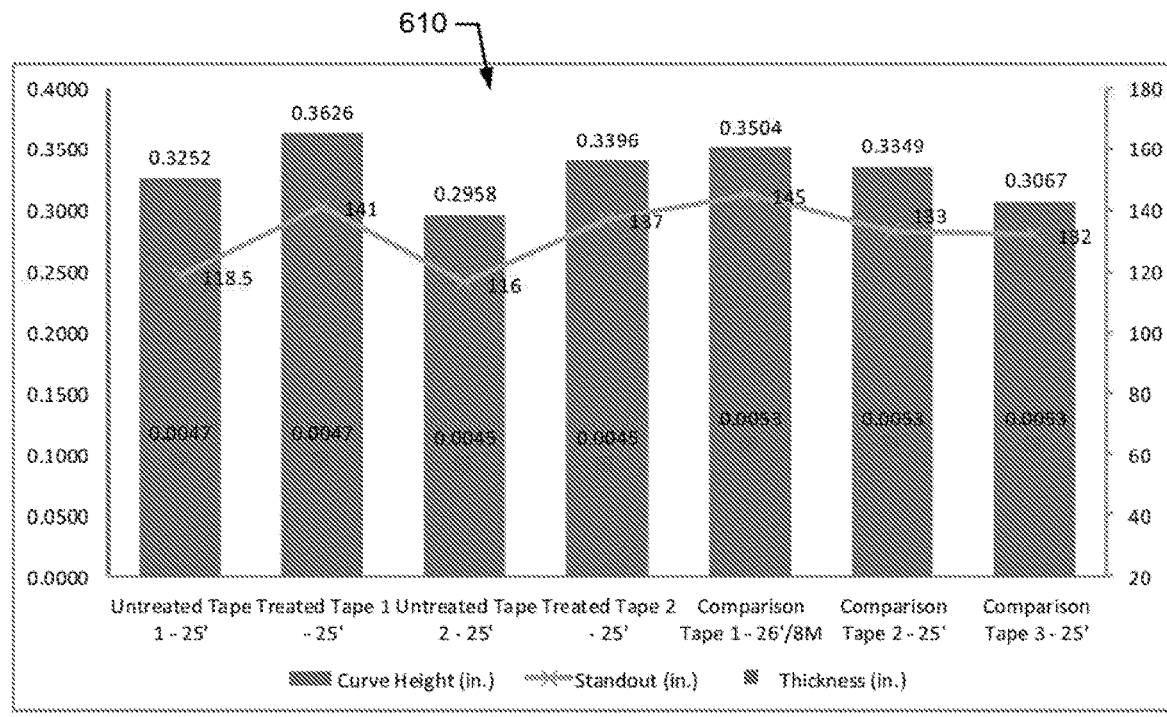
Figure 11:
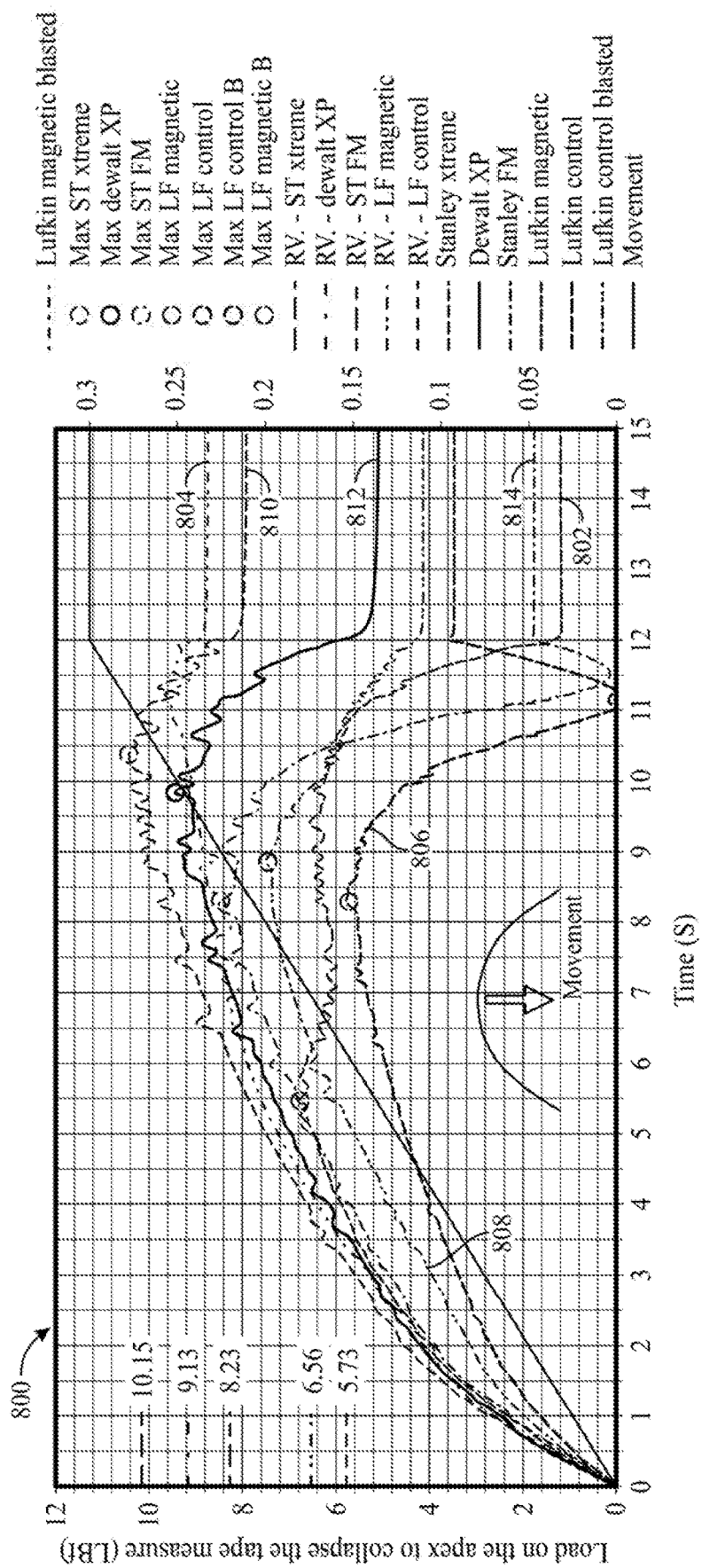
Figure 12:
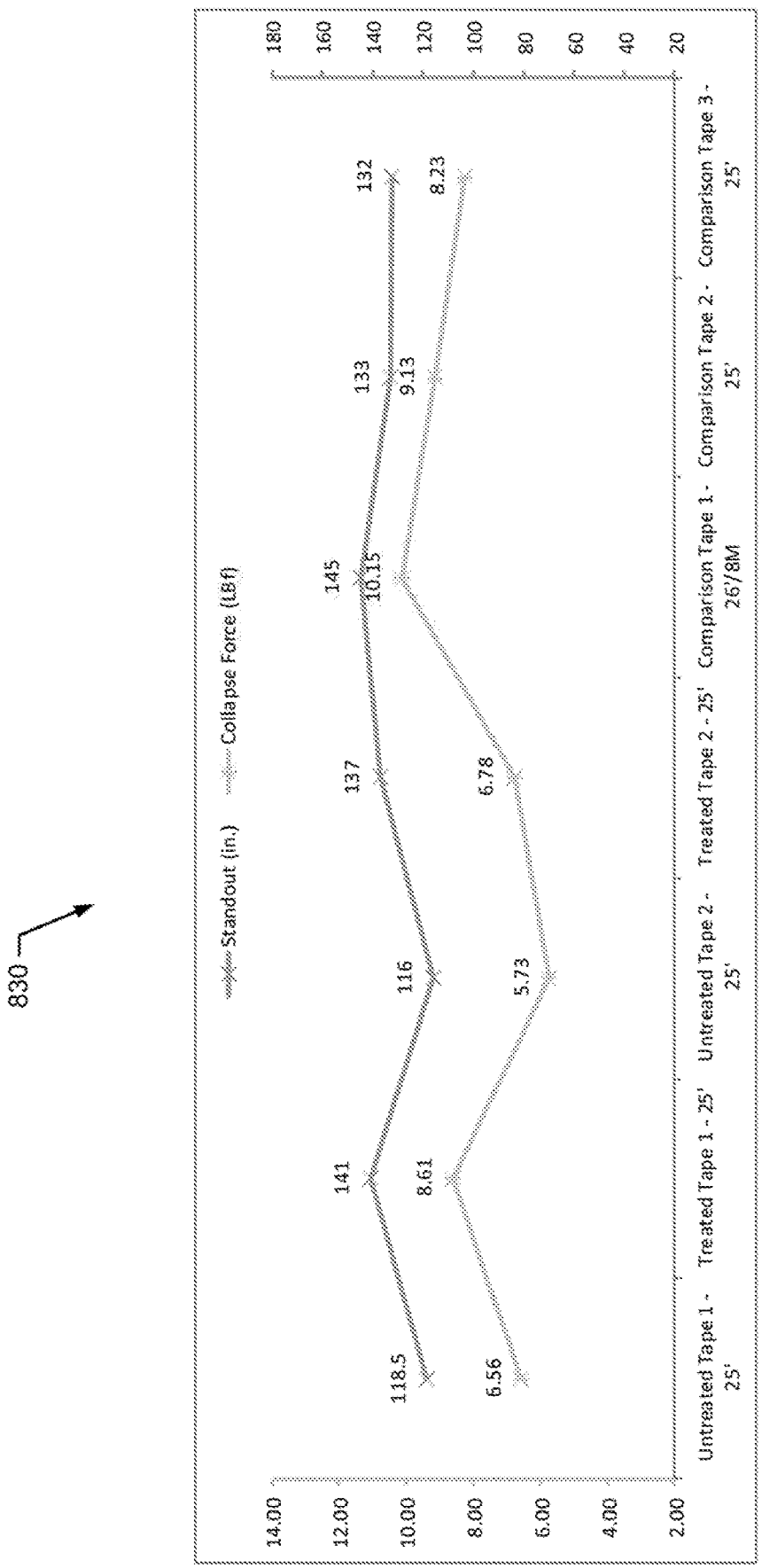
Figure 15A:
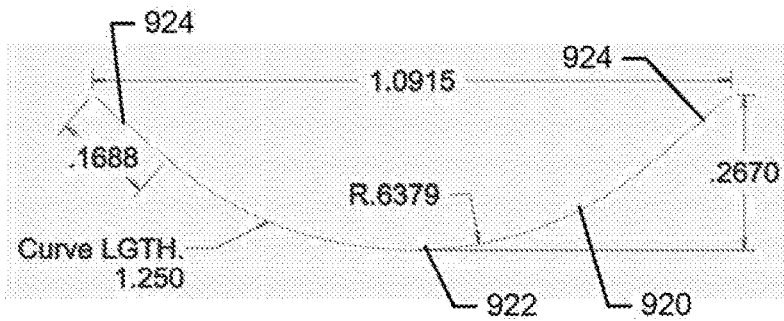
Figure 15B:
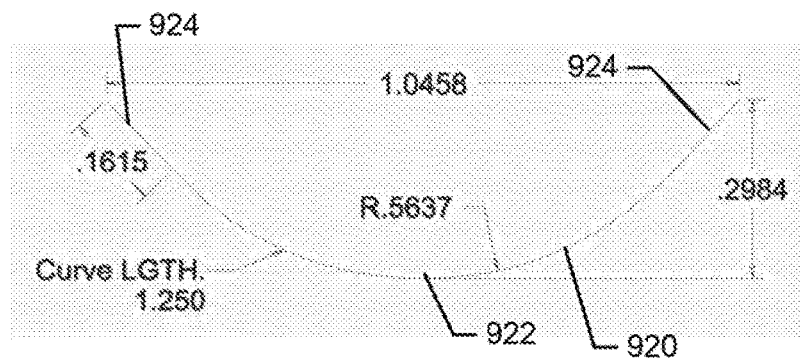
Figure 15C:
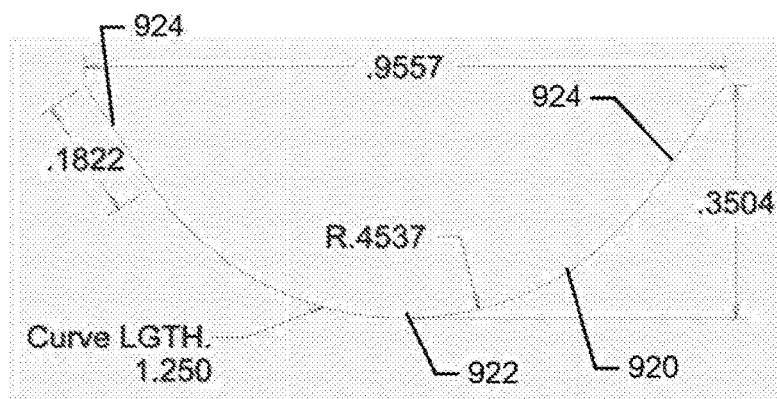
Figure 16A:
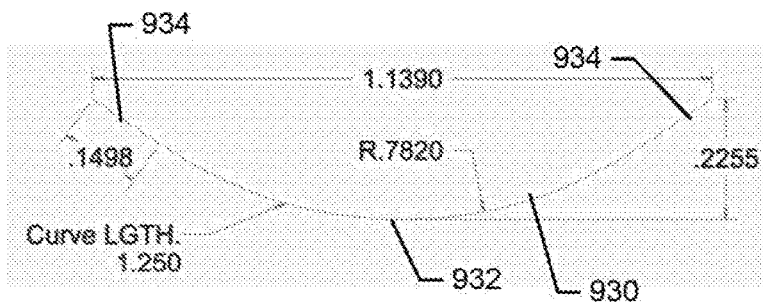
Figure 16B:
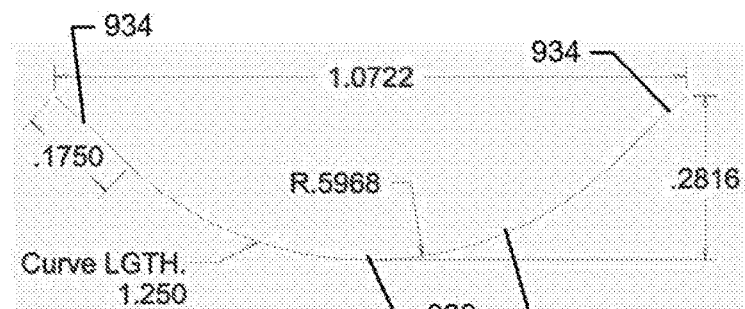
Figure 16C:
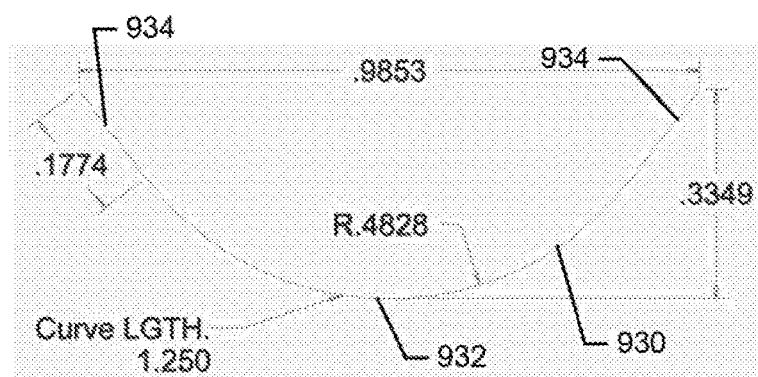
Figure 17A:
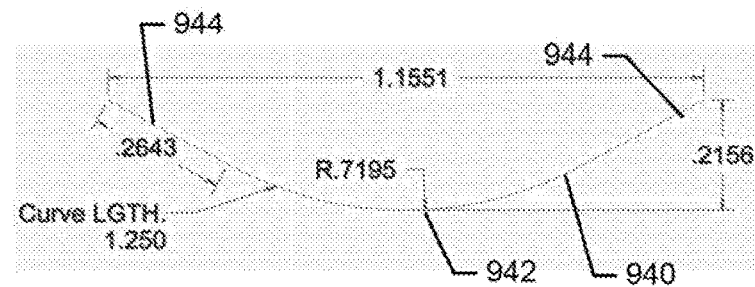
Figure 17B:
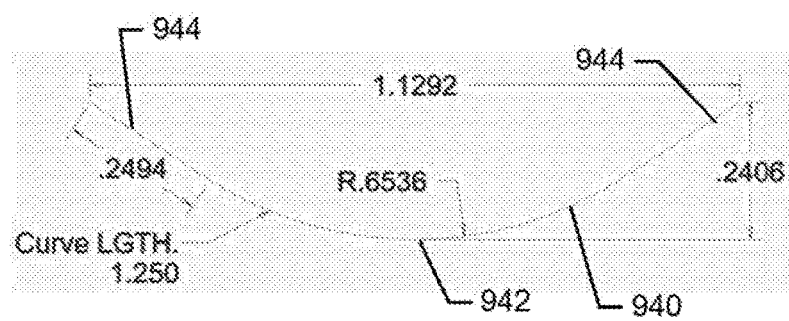
Figure 17C:
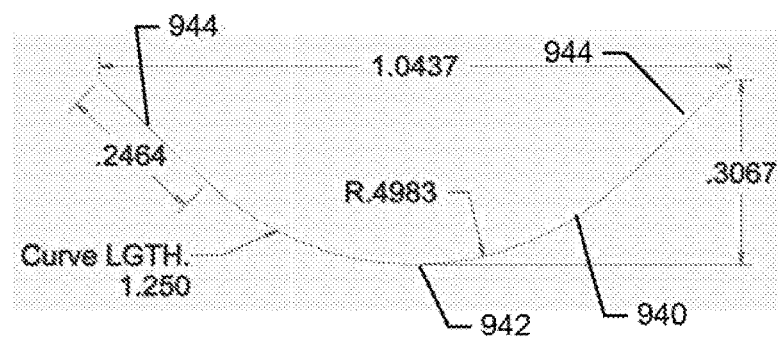
Figure 18A:
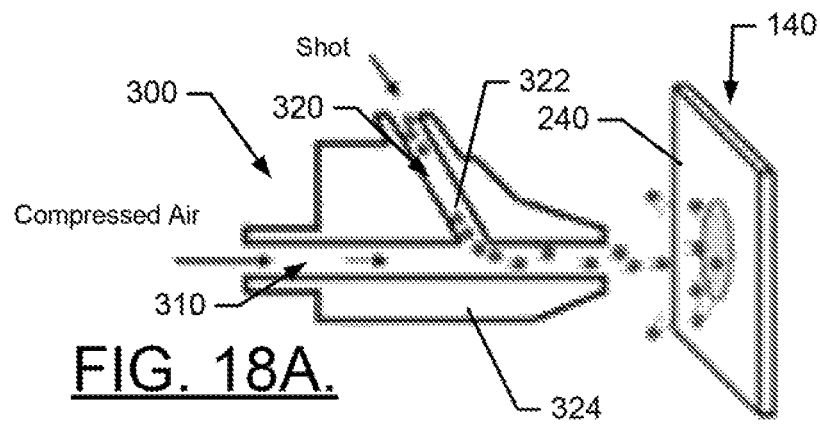
Figure 18B:
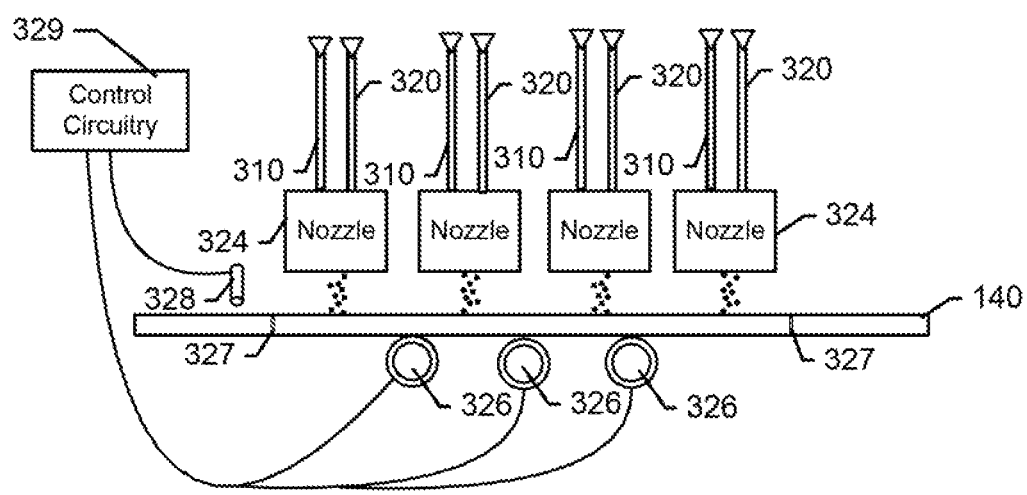
Figure 19:
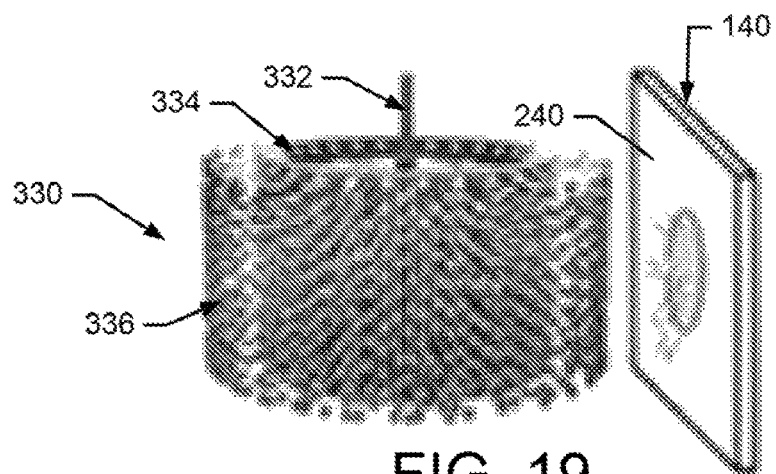
Figure 20:
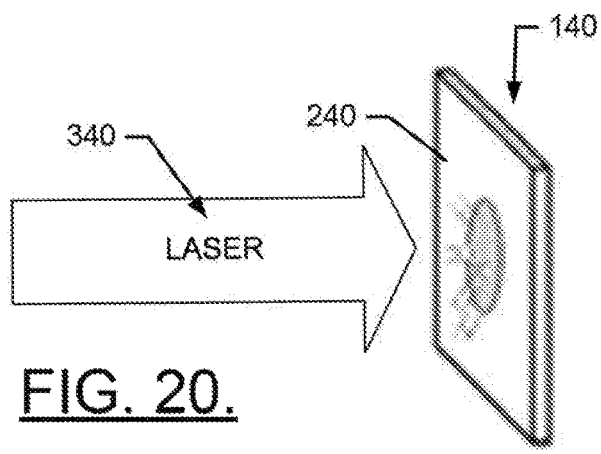
Figure 21:
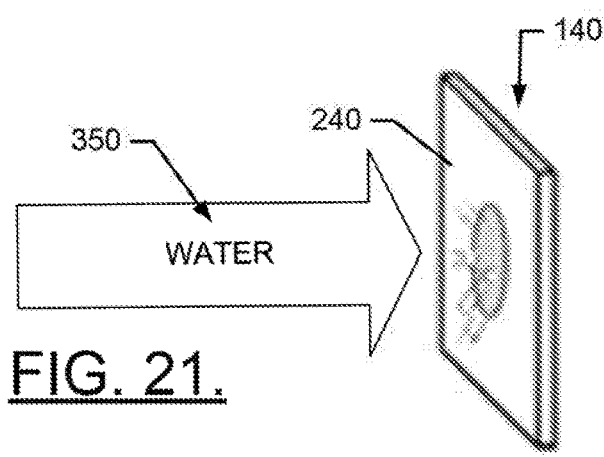
Figure 22A:
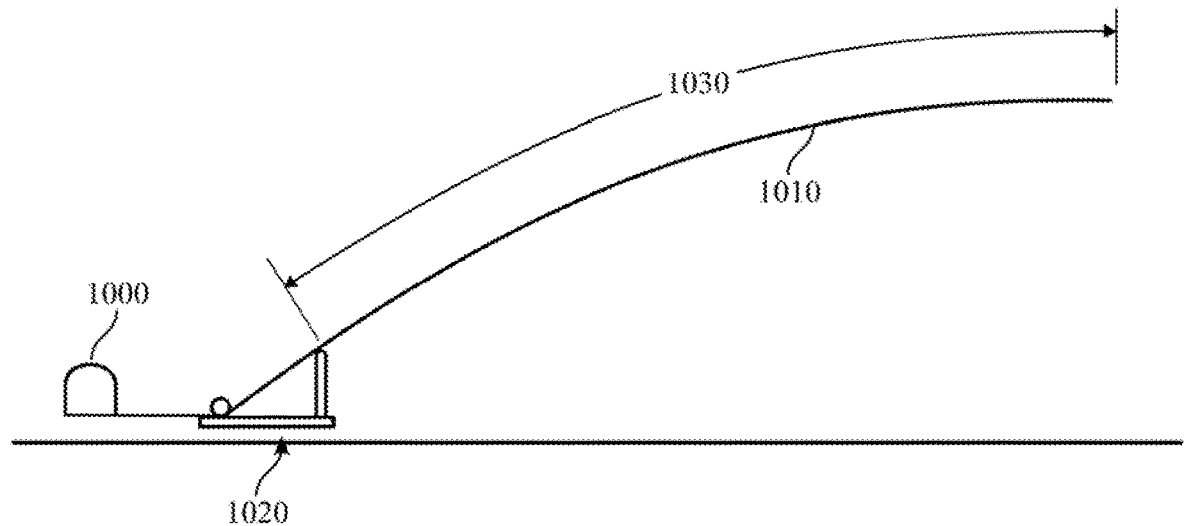
Figure 22B:
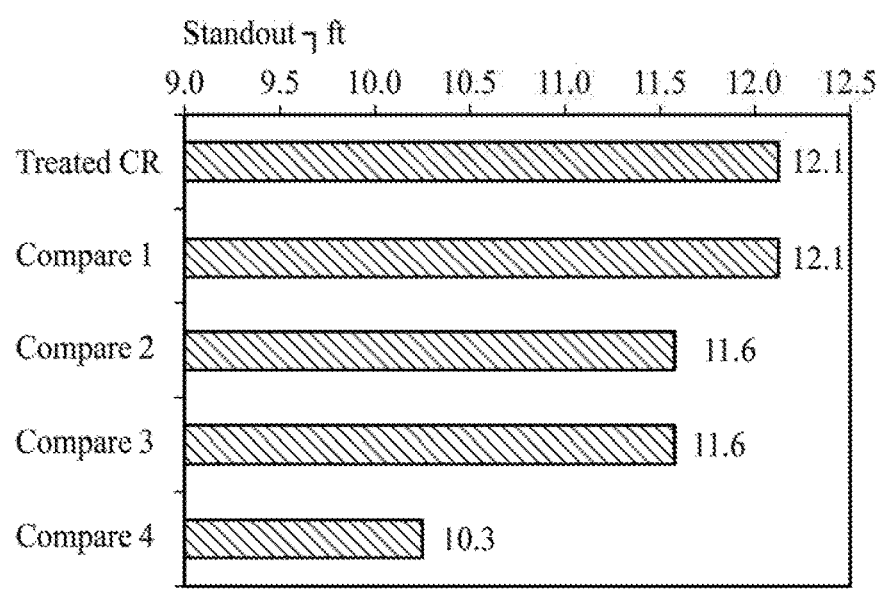
Figure 23A:
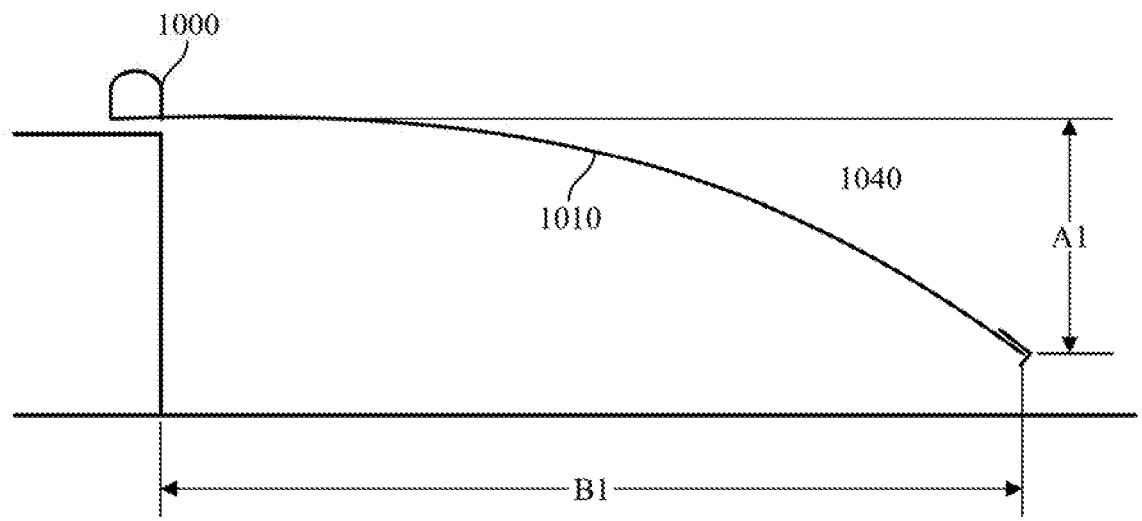
Figure 23B:
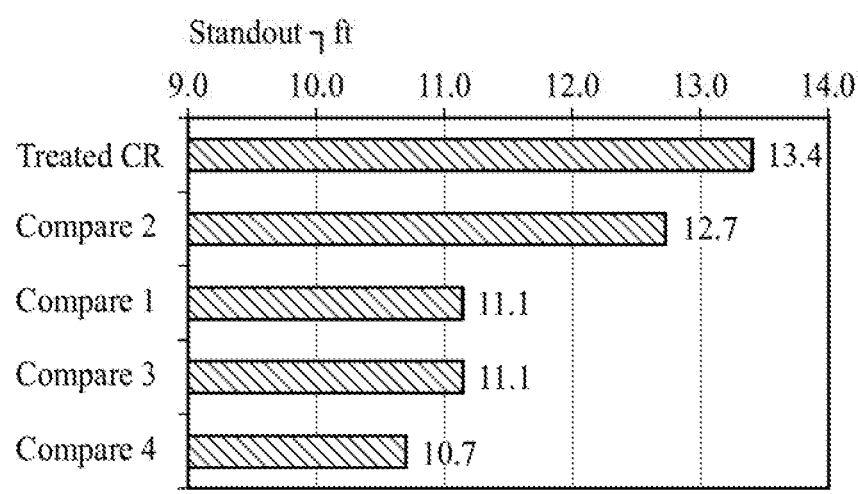
Figure 24A:
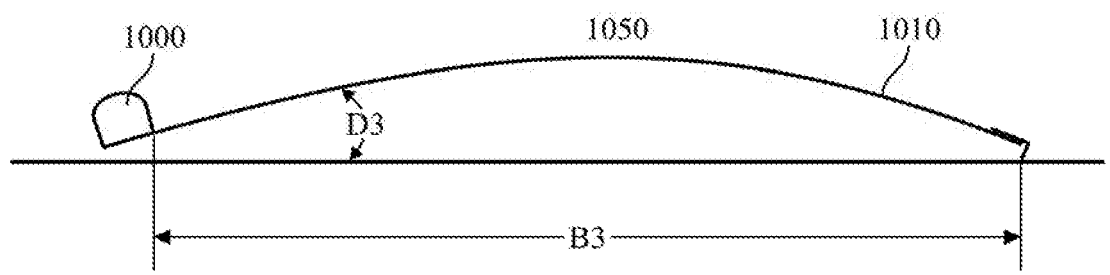
Figure 24B:
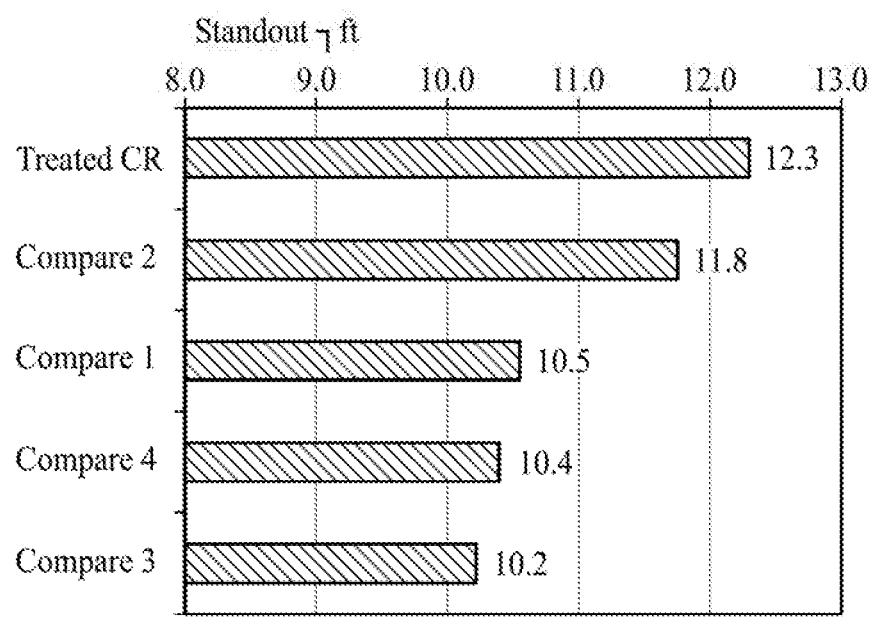
Figure 25A:
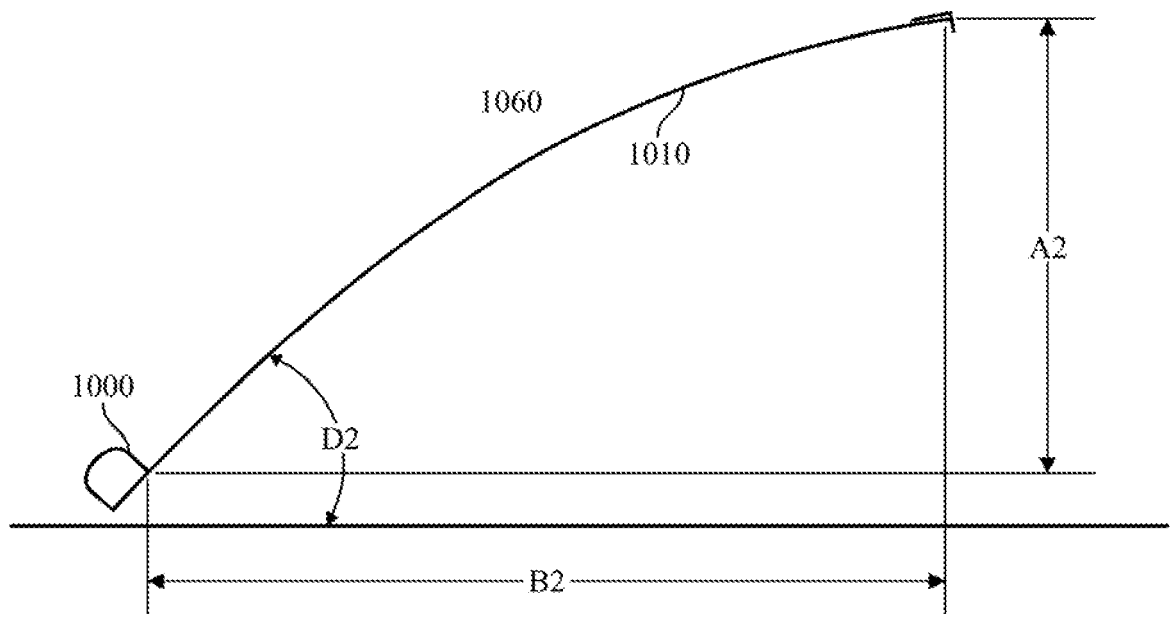
Figure 25B:
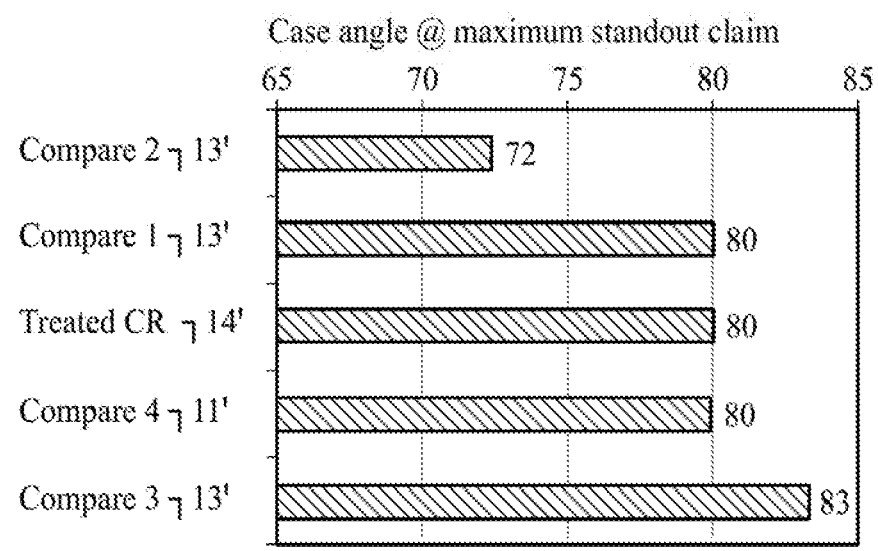

FIG. 7, which is defined by FIGS. 7A and 7B, illustrates a chart of various characteristics of a number of samples of blades including blades of an example embodiment;

FIG. 8 illustrates a combination chart showing curve height in a vertical bar chart for each respective measuring tape device shown in FIG. 7 in accordance with an example embodiment;

FIG. 9 illustrates a combination chart having the same vertical bar chart of FIG. 8 with thickness also plotted, except that each bar now shows standout instead of collapse force in accordance with an example embodiment;

FIG. 10 illustrates a chart showing a number of characteristics measured along with a variance of some of those characteristics measured to the treated tape 1 of FIG. 7;

FIG. 11 shows a graph of load on the apex to collapse the blade and vertical displacement on the vertical axis, with respect to time on the horizontal axis in accordance with an example embodiment;

FIG. 12 illustrates a chart showing standout and collapse force measurements for each of the measuring tape devices mentioned above in accordance with an example embodiment;

FIG. 13, which is defined by FIGS. 13A, 13B, 13C and 13D, illustrates cross sections for untreated tape 1 (i.e., FIGS. 13A, 13B and 13C) and for treated tape 1 (i.e., FIGS. 13A, 13B and 13D) in accordance with an example embodiment;

FIG. 14, which is defined by FIGS. 14A, 14B, 14C and 14D, illustrates cross sections for untreated tape 2 (i.e., FIGS. 14A, 14B and 14C) and for treated tape 2 (i.e., FIGS. 14A, 14B and 14D) in accordance with an example embodiment;

FIG. 15, which is defined by FIGS. 15A, 15B, and 15C, illustrates cross sections for comparison tape 1 in accordance with an example embodiment;

FIG. 16, which is defined by FIGS. 16A, 16B, and 16C, illustrates cross sections for comparison tape 2 in accordance with an example embodiment;

FIG. 17, which is defined by FIGS. 17A, 17B, and 17C, illustrates cross sections for comparison tape 3 in accordance with an example embodiment;

FIG. 18, which is defined by FIGS. 18A and 18B, illustrates a shot peening assembly in accordance with an example embodiment;

FIG. 19 illustrates a bead brush assembly for performing cold working of one side of the blade in accordance with an example embodiment;

FIG. 20 illustrates a laser etching assembly for relieving residual surface stress on one side of the blade in accordance with an example embodiment;

FIG. 21 illustrates a water blasting assembly for relieving residual surface stress on one side of the blade in accordance with an example embodiment;

FIG. 22, which is defined by FIGS. 22A and 22B, shows a droop test methodology for determining a breakthrough standout in accordance with an example embodiment;

FIG. 23, which is defined by FIGS. 23A and 23B, shows a droop test methodology for determining a breakthrough standout in accordance with an example embodiment FIG. 24, which is defined by FIGS. 24A and 24B, shows a droop test methodology for determining a breakthrough standout in accordance with an example embodiment;

FIG. 25, which is defined by FIGS. 25A and 25B, shows a droop test methodology for determining a breakthrough standout in accordance with an example embodiment; and FIG. 26, which is defined by FIGS. 26A, 26B and 26C, illustrates measurements taken along sample blades in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
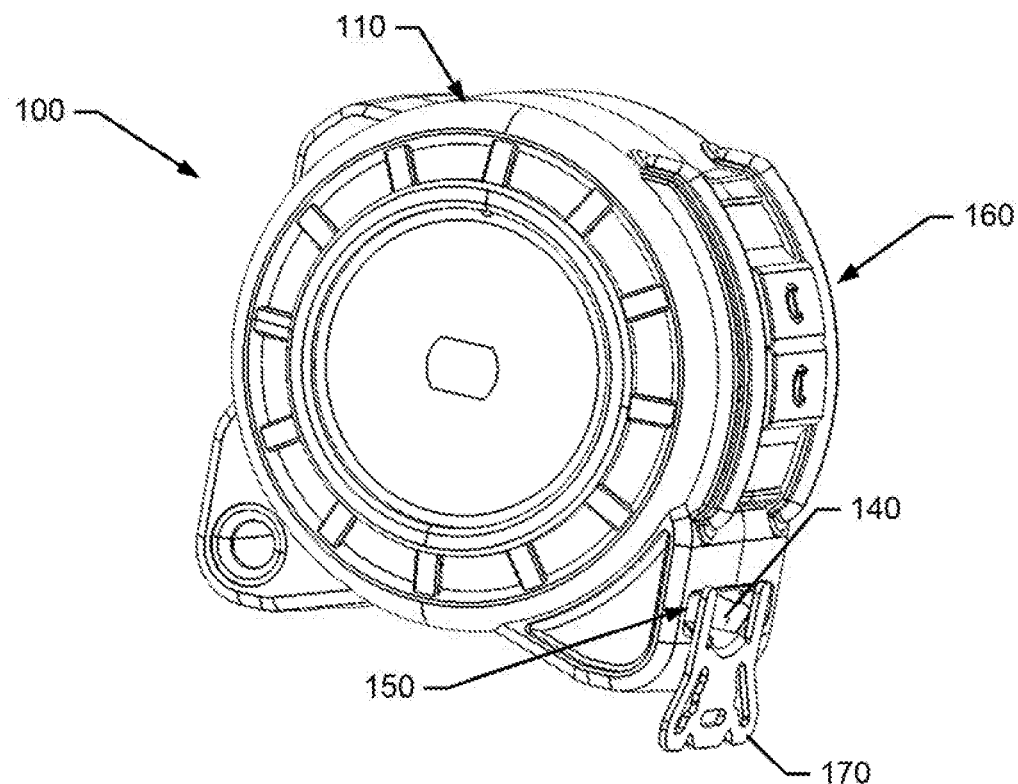
FIG. 1 illustrates a perspective view of a measuring tape device in accordance with an example embodiment.

As indicated above, some example embodiments may relate to the provision of a measuring tape device that may have an improved blade standout. However, merely improving standout can be accomplished in a number of different ways. One relatively simple way to improve standout is to improve the thickness of the blade. Obviously, increasing the thickness of a blade that is made of metal will also substantially increase the weight of the measuring tape device and possibly also constrain length. Thus, it is sometimes not merely desirable to increase standout, but to have the longest possible standout, with the lowest possible weight. Achieving a balance between weight and standout is not necessarily a straightforward design achievement. Thus, some example embodiments attempt to strike a balance between weight and standout in order to provide a relatively thin blade that still retains superior standout qualities. This may be accomplished by employing a tape having various unique structural characteristics that result from treatments such as increased cupping and/or surface treatment on one side of the blade where the treatment is provided over at least a segment of the blade at a critical region or zone. However, the unique structural characteristics could alternatively be applied over the entire length of the blade in some cases. FIG. 1 illustrates a perspective view of a measuring tape device, and FIG. 2 illustrates a block diagram of such device, in accordance with an example embodiment.

Figure 2:
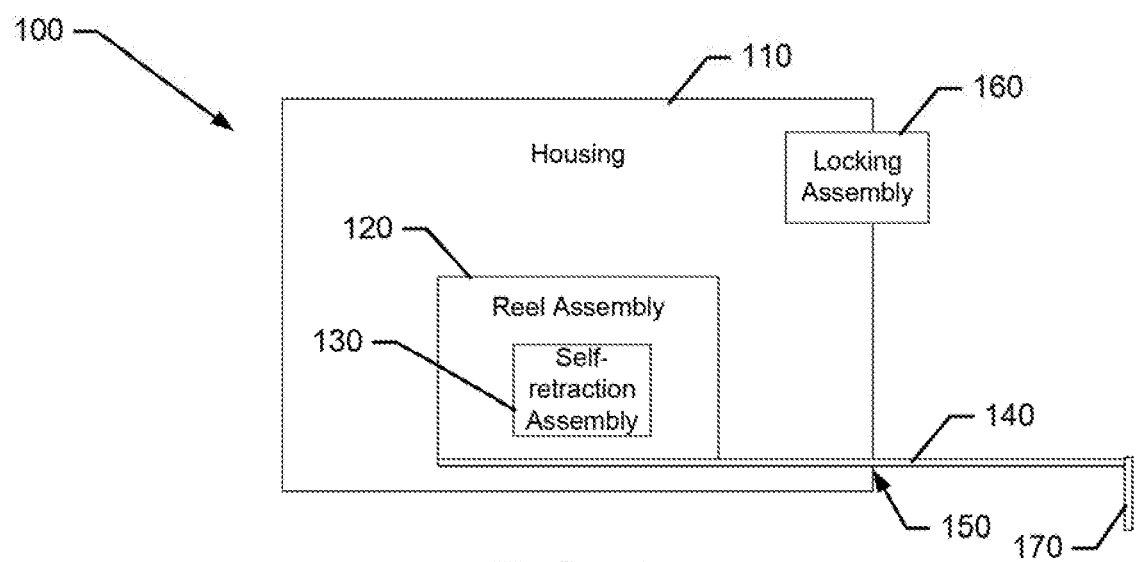
FIG. 2 illustrates a block diagram of the measuring tape device in accordance with an example embodiment.

Referring now to FIGS. 1 and 2, a measuring tape device 100 of an example embodiment may include a housing 110 inside which a reel assembly 120 and a self-retraction assembly 130 may be provided. A blade 140 (or tape) portion of the device 100 may be wound onto the reel assembly 120. The blade 140 may be paid out through an aperture 150 formed in the housing 110. Although not required, in some cases, a locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140). The blade 140 can be extended in a guided fashion toward an intended target anchor point while the blade 140 continues to have sufficient rigidity to standout. The blade 140 will continue to extend and standout until the weight of the blade 140 extended past the aperture 150 is sufficient to cause the blade 140 to collapse and bend, thereby losing its rigidity and preventing any further guided extension. The loss of sufficient rigidity which causes collapse and bending of the blade 140 generally occurs at a portion of the blade 140 that can be referred to as a "critical region" since it can occur at slightly different points (but generally in the same region) on different extension operations, and on different individual measuring tapes.

A typical blade may be made to have the same width and height (or thickness), and same amount of cupping across its entire length. However, it may be possible to increase the standout capabilities of the blade 140 by changing certain characteristics of the blade 140 at certain strategic locations along the length of the blade 140. For example, the cupping may be increased over an area covering or otherwise proximate to the critical region of the blade 140 to enable the blade 140 to retain its rigidity and avoid collapsing to achieve greater standout. Of note, typical blades are cupped as part of the normal manufacturing process. For example, a coiled (flat) metal strip may be heated and drawn through a forming machine to generate cut strips of metal. The forming machine typically includes a circular portion around which the blade is bent longitudinally. By virtue of this process that occurs in most forming machines, the cupping of the blade generally results in a rounded portion (forming an apex along the longitudinal centerline of the blade) and two wing portions extending longitudinally on opposite sides of the rounded portion. The wing portions are generally flat, and are formed as a mirror image of each other. As such, the two wing portions each have the same width (measured in a direction substantially perpendicular to the longitudinal centerline of the blade). Meanwhile, the circular portion has a radius that is determined by a radius of the surface around which the forming machine bends flat metal strip during the forming process.

As noted above, after this initial cupping operation is completed, additional cupping (at least over the critical region) may increase standout. There may be a number of ways to achieve the capability for greater standout using increased cupping strategies. One such way may include the application of pressure along lateral edges of a portion of the blade 140 (presumably near the critical region). For example, two long and straight walls may be provided on opposing sides of the blade 140 after the blade 140 has initially been treated to provide cupping that is common to most blades (e.g., by the method described above or by whatever method chosen). The two long and straight walls may then be moved toward each other to bend the blade 140 even more than the cupping that was already provided. In other words, the degree of cupping or amount of curvature may be increased over the range that the two long and straight walls contact the lateral edges of the blade 140.

The increased curvature or cupping of the blade 140 provided by the two long and straight walls may, however, have a positive impact on standout, but may create other problems. For example, a distinct transition point where a prompt jump occurs between portions of the blade 140 having two different degrees of curvature or cupping may be formed at the point at which each of the two long and straight walls terminated. Thus, four distinct transition points (two on each side of the blade 140 separated from each other by the length of the two long and straight walls) may be formed on the blade 140. These distinct transition points may get stuck on the aperture 150 during reeling of the blade 140 by the reel assembly 120. Transitions of this nature are also likely to increase the tendency of the blade 140 to "roll" and break when the blade 140 is extended substantially vertically (as opposed to the typical extension horizontally). This method of increasing cupping also creates a relatively deep "V" shape (and corresponding sharper apex) in the blade over the region that is undergoes this additional bending. Thus, it may be desirable to find a way to increase cupping that does not result in prompt jump changes in curvature of the blade 140 or very deep V shapes or sharp apexes. Other advantages may also be achieved by increasing cupping in other ways.

In accordance with an example embodiment, the secondary bending operation described above may be avoided, and a different way of increasing cupping may be employed. In this regard, for example, the convex side of the cupped blade may be surface treated in a stress relieving operation. The surface treatment in this manner, which relieves stresses on one side of the blade, may alter blade geometries and/or structural characteristics in ways that improve standout, but also do so substantially in a way that does not require substantial increases in blade weight. The changes to the shape and structural characteristics of the blade will be described below in reference to FIGS. 13-17. However, a description of the general process of surface treatment of an example embodiment will first be described in reference to FIGS. 3-5.

Figure 3:
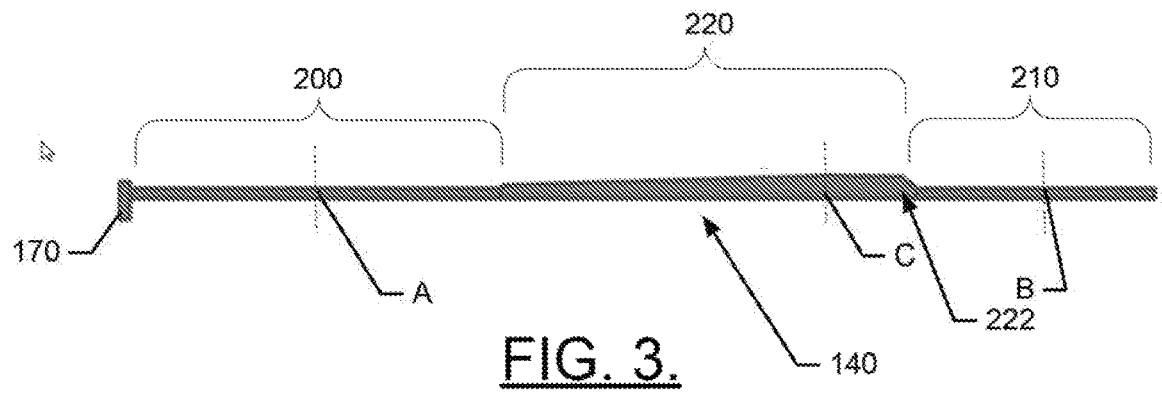
FIG. 3 illustrates a longitudinal cross section view of a blade portion of a measuring tape device in accordance with an example embodiment.
Figure 4:
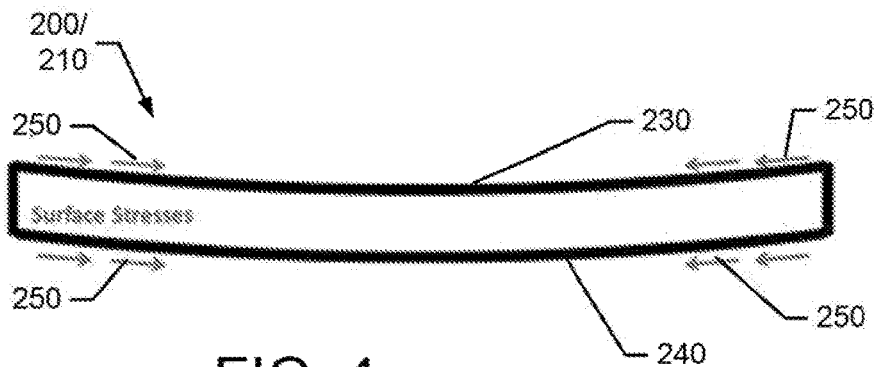
FIG. 4 illustrates a transversal cross section view of the blade portion of the measuring tape device outside a critical region in accordance with an example embodiment.
Figure 5:
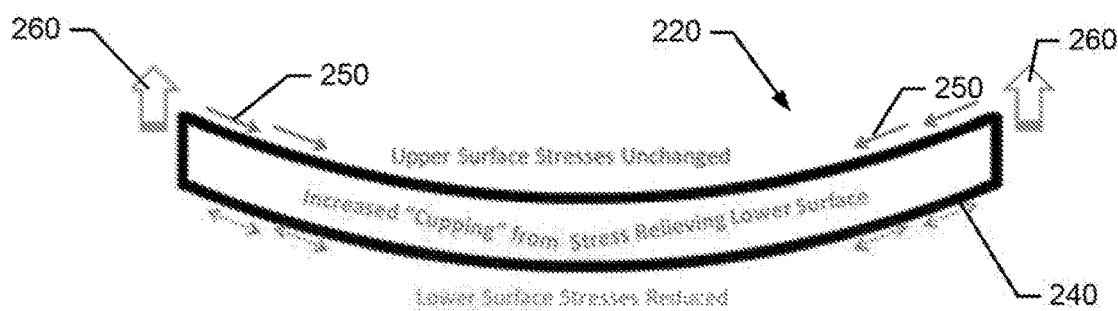
FIG. 5 illustrates a transversal cross section view of the blade portion of the measuring tape device at the critical region in accordance with an example embodiment.

In this regard, FIG. 3 illustrates a longitudinal cross section view of the blade 140 to facilitate the definition of various regions of the blade 140, and to show one particular example embodiment for improving standout of the blade 140. FIG. 4 illustrates a transversal cross section view of the blade 140 of FIG. 3, taken at either point A or point B of FIG. 3 (or taken at point C prior to the application of surface treatment (e.g., a stress relief operation) as described herein). FIG. 5 illustrates a transversal cross section view of the blade 140 of FIG. 3 taken at point C (i.e., within the critical region) after surface treatment (e.g., stress relief operations) in accordance with one example embodiment.

Referring now to FIGS. 3-5, it can be appreciated that the blade 140 may include a first non-critical region 200 disposed proximate to a first end of the blade 140 and a second non-critical region 210 disposed proximate to a second end of the blade 140. The first end of the blade 140 may extend from the end hook 170 to a start of a critical region 220. The critical region 220 may then extend to meet the second non-critical region 210. The second non-critical region 210 may then extend from the critical region 220 to the second end of the blade 140. Thus, the critical region 220 is disposed between the first and second non-critical regions 200 and 210.

In some cases, the critical region 220 may be disposed spaced apart from the end hook 170 by at least a particular distance that is determined based on a combination of factors including width of the blade 140, material used to form the blade 140, amount of cupping of the blade 140, thickness of the blade 140, etc. Thus, the critical region 220, which is a range of locations along the longitudinal length of the blade 140, may slide closer to or farther from the end hook 170 with different combinations of the above listed factors, and may expand in size based on the different combinations of the above listed factors. For most common sizes of measuring tape devices, the critical region 220 may lie in a range between about 8 feet to about 15 feet from the end hook 170. However, other ranges are possible. Table 1 below shows a number of dimensions associated with blades that have been processed over a treated region (which may correspond to the critical region 220) using a method of surface treatment of one side of the blade (e.g., performing stress relieve on the treated side) described below to show examples of how the factors described above may impact the critical region 220, and standout that can be achieved by treating the critical region 220 using the techniques described herein.

Example Blade 1
Blade thickness @ 6': 0.0055 in
Blade Width: 1.00"
Treated region: 77.5 in-136 in
Standout: 129 in
Example Blade 2
Blade thickness @ 6': 0.0065 in
Blade Width: 1.1875"
Treated region: 107.25 in-162.5 in
Standout: 155
Example Blade 3
Blade thickness @ 6': 0.0055 in
Blade Width: 1.00"
Treated region: 83 in-163 in
Standout: 128
Example Blade 4
Blade thickness @ 6': 0.006 in
Blade Width: 1.1875"
Treated region: 107.5 in-162 in
Standout: 139
Example Blade 5
Blade thickness @ 6': 0.006
Blade Width: 1.1875"
Treated region: 108 in-162 in
Standout: 138
Table 1

In an example embodiment, an amount of curvature or cupping of the blade 140 in the first and second non-critical regions 200 and 210 may be less than the amount of curvature or cupping of the blade 140 in the critical region 220. By increasing the degree or amount of cupping in the critical region 220 relative to the degree or amount of cupping in the first and second non-critical regions 200 and 210, the critical region 220 may be more likely to maintain rigidity and avoid collapse on payout of the blade 140 through the critical region 220. The blade 140 may therefore have a longer standout. However, the increased cupping provided in the critical region 220 may be accomplished via a stress relief operation that may be easier to employ and avoid the formation of distinct or prompt jump-type transition points on the blade 140, which would result from mechanical bending operations. In this regard, a transition zone 222 may be defined between the critical region 220 and its intersection with either or both the first and second non-critical regions 200 and 210. In some cases, an amount of cupping in the transition zone may change relatively slowly and/or evenly from the amount of cupping in the first and second non-critical regions 200 and 210 to the amount of cupping in the critical region 220 (e.g., 20% higher than cupping in the non-critical regions). For example, the transition zone 222 may be greater than half an inch long to avoid any prompt jumps in cupping degree along the blade 140.

Referring to FIG. 4, it should be appreciated that when cupping is performed on the blade 140 (e.g., over the entire length of the blade 140), the cupping creates surface stresses on both a concave side 230 and a convex side 240 of the blade 140. The concave side 230 is generally the top side when the blade 140 is used for measuring a medium, and generally has measurement markings disposed thereon. The concave side 230 may be expected to face away from the medium being measured. The convex side 240 is typically the bottom side when the blade 140 is used for measuring, and lies next to the medium being measured. As shown in FIG. 4, the concave side 230 and the convex side 240 may have substantially matching degrees of concavity and convexity, respectively. In other words, the amount of curvature or cupping in the transverse direction is substantially the same for both the concave side 230 and the convex side 240 although one side is curved inward and the other outward. The curvature or cupping of the blade 140 may be provided during the production process to generate the two substantially equal degrees of curvature, and corresponding surface stresses as shown by arrows 250 in FIG. 4. In this regard, the production process may include, as noted above, heating a metallic sheet material that has been cut to the desired width and then drawing the material through a structure that forms the drawn material to have the cupped transverse cross section. This cupped structure may then be cooled and tempered, resulting in the surface stresses shown in FIG. 4.

Working a surface of a material such as metal using certain processes that relieve the tensile stresses (e.g., residual surface stresses) on the surface can modify the mechanical properties of the metals in potentially positive ways. For example, relieving the tensile stresses on metallic surfaces (including replacement of tensile stresses with compressive stresses) can strengthen the materials. In some cases, the stress relief operations cause surface materials to be spread plastically to change mechanical properties of the surface to replace tensile stress with compressive stress. Such plastic deformation may also alter the shape of the surface that is plastically deformed. Moreover, in a case where opposing surfaces are treated differently (e.g., where one surface is plastically deformed to relieve tensile stresses and the opposing surface is not), a bending of the material between the surfaces may result. Referring to FIG. 5, lowering tensile stresses on the surface of the convex side 240, while not altering stresses on the surface of the concave side 230 may cause increased cupping in the critical region 220 (as shown by arrows 260).

The working of the surface of the convex side 240 of the blade 140 (i.e., surface treatment) in the critical region 220 may be accomplished via a number of different methods. For example, shot peening may be used to cold work the convex side 240 of the blade 140 (at least in the critical region 220). As an alternative to shot peening, water blasting, a bead brush, or other methods could be used to propel some material against the surface of the convex side 240, which material may act like small ball peen hammers plastically deforming the surface of the convex side 240. The convex side 240 may plastically deform while reducing tensile stresses on the surface of the convex side 240 and cup further in the direction shown by arrow 260 in FIG. 5. Thus, the portion of the blade 140 (e.g., the critical region 220) that is worked or surface treated may have a greater degree of curvature or cupping than other portions of the blade 140. In some cases, the degree of cupping may be increased by at least 20%. However, more or less cupping can be achieved based on altering the time period over which the surface treatment is provided, the pressure employed, and/or other factors.

Unlike mechanical bending, the working of the surface using the methods described above does not create a prompt jump or distinct change in the degree of cupping at the first and second ends of the critical region 220. Instead, a gradual transition is formed as the material near the first and second ends of the critical region 220 is gradually altered in its curvature from no increased curvature immediately outside the critical region 220 to full increased curvature at points more distant from the edges and within the critical region 220. The lack of a distinct change in cupping makes the blade 140 less susceptible to catching on the aperture 150, and facilitates easier reeling.

Although some of the methods of surface treatment described above may be considered "cold" working, other surface treatment methods are also possible. For example, laser etching of the surface of the convex side 240 of the blade 140 may be accomplished using a laser that removes (e.g., by burning, cutting or vaporization) material from the surface of the convex side 240 to relieve residual stresses on the surface. The laser may be used to remove material in any desirable pattern, and certain patterns may result in better stress relief and or better enhancement of cupping than others. Thus, the laser may be programmed to operate under the control of a controller that is configured to remove material in any desirable pattern that achieves the properties (e.g., the degree of cupping) that are desired for the blade 140.

Some example embodiments may effectively add, between the first and second non-critical regions 200 and 210, a portion of the blade 140 (e.g., at the critical region 220) that has enhanced cupping or curvature relative to the amount of curvature of the blade 140 in the first and second non-critical regions 200 and 210. The width of the blade 140 in the critical region 220 may be slightly less than the width of the blade 140 in the first and second non-critical regions 200 and 210 due to the increased curvature of the blade 140 in the critical region 220. However, the thickness of the blade 140 may effectively remain unchanged, or at least any material removal or plastic deformation may only create negligible changes to the thickness of the blade 140 in the critical region 220.

Although the area of enhanced cupping (e.g., in the critical region 220) may not experience a rapid or prompt change in the amount of cupping at ends of the critical region 220 due to a gradual change in cupping being experienced at these points, the amount of cupping may otherwise be substantially similar over interior portions of the critical region 220 (e.g., portions thereof that are spaced apart from the respective opposing ends). However, if desired, the amount of cupping could be increased even further at specific portions of the critical region 220 to achieve a non-uniform amount of cupping within the critical region 220. Additionally or alternatively, the entire length of the blade 140 (or a substantial portion thereof) may be treated to increase the amount of cupping in the manner described herein.

Figure 6:
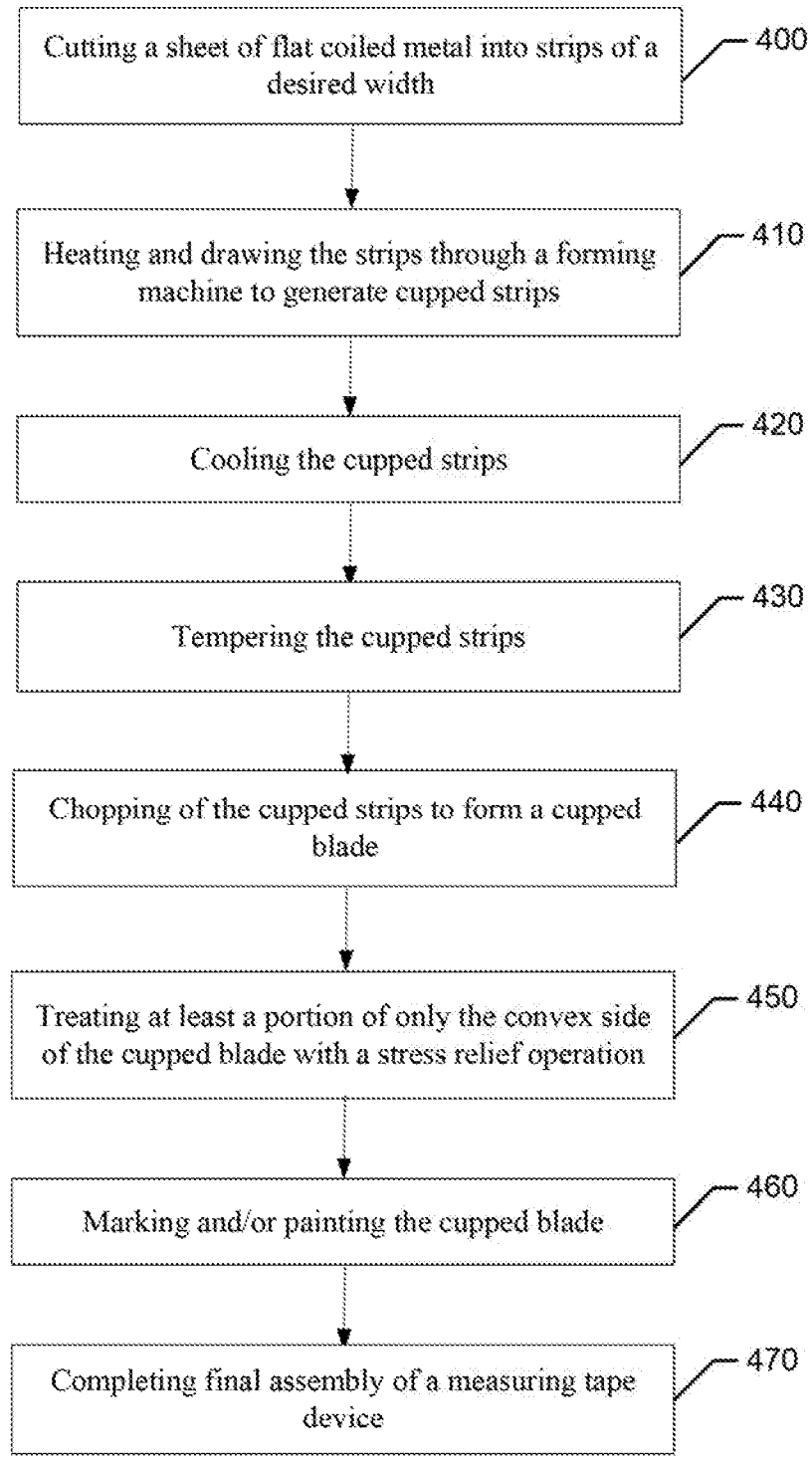
FIG. 6 illustrates a method of making a measuring tape device having an improved blade standout in accordance with an example embodiment.

FIG. 6 illustrates a block diagram for a method of producing a tape measuring device in accordance with an example embodiment. As shown in FIG. 6, the method may include cutting a sheet of flat coiled metal (e.g., steel) into strips of a desired width at operation 400. As an example, if the metal sheet had a width of 24 inches and the desired width (of the blade 140) is one inch, then 24, one inch strips may be cut at operation 400. The method may include heating and drawing the strips through a forming machine to generate cupped strips at operation 410. The cupped strips may be curved by the forming machine while hot, and may then the cupped strips may be cooled at operation 420. Optionally, the cupped strips may be tempered at operation 430 prior to chopping of the cupped strips (tempered or otherwise) to form a cupped blade at operation 440. The chopping of the cupped strips may cut the cupped strips to the desired length of the tape measuring device for which they will form the blade. For example, the cupped strips may be chopped to 10 ft, 25 ft, 35 ft or 50 ft lengths for respective different measuring tapes. At operation 450, at least a portion of only the convex side of the cupped blade may be treated with surface treatment (e.g., a stress relief operation). For example, the critical region of the cupped blade may be treated with the stress relief operation that increases the surface roughness of the area that is treated. As such, the convex side of the blade in the critical region (e.g., only) may have increased surface roughness relative to all other portions of the blade. The surface treatment/stress relief operation may enhance the cupping (e.g., the degree of curvature) of the cupped blade in the corresponding portion. Thereafter, the cupped blade may optionally be painted and/or marked at operation 460 prior to final assembly of a measuring tape device (e.g., attaching the cupped blade to a reel assembly and providing the same within a housing and affixing an end hook, etc.) at operation 470. However, as will be mentioned below, operations 450 and 460 could be swapped in their ordering in some cases.

As noted above, the treatment step (operation 450) can be accomplished via any of a number of different methods. Regardless of the method used, the resulting characteristics and structures of the blade 140 may be altered in unique ways. As a result, when the blade 140 has been surface treated, various unique structural characteristics and combinations of characteristics are possible. However, it should be appreciated that the steps or operations associated with processing metal or other materials to achieve the cupped blade may be changed with respect to their specific content or order in some cases. Thus, the method more generally could be stated as providing a cupped blade with substantially uniform cupping over a longitudinal length of the blade and then performing operation 450 (perhaps also followed by operations 460 and 470) on the cupped blade. As such, operations 400 to 440 could be one example of how to provide the cupped blade with the substantially uniform cupping over the longitudinal length of the blade. FIGS. 7-14 show various charts, illustrations and other data that demonstrate comparisons between surface treated blades (or measuring tape devices) and those without surface treatment.

FIG. 7, which is defined by FIGS. 7A and 7B, shows a chart of various characteristics of a number of samples. FIG. 7 shows vertical rows for each of a number of sample measuring tape devices with respective different blade characteristics. In this regard, FIG. 7 illustrates data associated with samples of five different measuring tape devices. The data for some of the measuring tape devices is averaged over multiple samples. Three measuring tape devices (i.e., comparison tape 1, comparison tape 2, and comparison tape 3) are merely provided for comparison purposes, and had blades that were not treated. However, the blades of two measuring tape devices were sampled both before surface treatment (as described herein) of the critical area and after such treatment. Row one data 500 shows data measured for a number of characteristics of untreated tape 1, which is a measuring tape device having a 25' blade. Row two data 502 shows the same characteristics measured for treated tape 1. Treated tape 1 differs from untreated tape 1 only in that the critical region 220 of treated tape 1 has received the surface treatment described herein.

Row three data 504 shows the same characteristics measured for untreated tape 1 and treated tape 1, measured for untreated tape 2, which also has a 25' blade. Row four data 506 shows the same characteristics measured for treated tape 2. Treated tape 2 differs from untreated tape 2 only in that the critical region 220 of treated tape 2 has received the surface treatment described herein. Row five data 508 shows the same characteristics measured for comparison tape 1. Row six data 510 shows the same characteristics measured for comparison tape 2. Row seven data 512 shows the same characteristics measured for comparison tape 3.

Weight characteristics (measured in pounds) for each measuring tape device are shown in the columns under the general weight category 520. In this regard, weight of the housing and end hook of each respective measuring tape device are shown along with the weight of the respective blades (i.e., in the "tape" column) and the total weight. Since there is effectively no change to the untreated tape 1 and untreated tape 2 beyond application of surface treatment as described herein, it is noteworthy that untreated tape 1 and treated tape 1 have the same weights in each respect and untreated tape 2 and treated tape 2 also have the same weights in each respect. It is also noteworthy that the weight of the blade does not change due to the application of the surface treatment described herein. Also noteworthy is the fact that the blades of untreated tape 1 and untreated tape 2 (along with their treated counterparts) are each under 0.5 pounds, whereas each of the blades of the comparison tapes is over 0.5 pounds. Accordingly, untreated tape 1 is the only studied measuring tape device with a total weight of less than one pound, and both the tape measuring devices that had treated blades weighed less than 1.12 pounds, whereas all of the other comparison tapes weigh greater than 1.13 pounds.

FIG. 7A also shows a width column 530 and a curve height column 532. The width column 530 shows the width of the blade in a flat configuration (i.e., prior to any type of cupping). Meanwhile, the curve height is representative of the height measured from the apex of the curve to the distal ends of the wings of the blade after cupping has been provided to the blade. FIG. 7A further shows a standout column 534, which illustrates an average measured standout for each respective one of the blades of the measuring tape devices. As mentioned above, standout can be increased in a number of ways. Thus, it is noteworthy that the heaviest blade tested (i.e., comparison tape 1) has the longest standout at 145 inches. Also noteworthy is the increase in standout that is achieved between the untreated tape 1 (with a standout of 118.5 inches) and treated tape 1 (with a standout of 141 inches), and the increase in standout that is achieved between the untreated tape 2 (with a standout of 116 inches) and treated tape 2 (with a standout of 137 inches). In each case, the untreated blade has a standout that is about 84% as long as the standout of the treated blade. As such, treating of the blade achieves at last about an 18% increase in standout length without any corresponding changes to the width or weight of the blade.

Column 536 illustrates a ratio of standout to flat width (i.e., a ratio of standout column 534 to width column 530). As can be seen by comparing treated and untreated blades in FIG. 7A, the ratio is increased by at least about 18% by applying the surface treatment of example embodiments. However, it should also be noted that the ratio of standout to flat width for each treated blade example is at least 116.1, and no untreated blade achieves a ratio of at least 116.1. Although not shown in FIG. 7A, a ratio of standout to tape weight (i.e., weight of the blade) for the treated tape 1 is 307.9. The ratio of standout to tape weight for treated tape 2 is 296.5. Meanwhile, the ratio of standout to tape weight for the comparison tape that has the best standout (i.e., comparison tape 1) is 231.6. Thus, a ratio of standout to tape weight of greater than 250 is achievable by performing surface treatment to the convex side of the blade in accordance with an example embodiment.

Some other data shown in FIG. 7A includes a thickness column 538 for thickness (in inches) with paint and a thickness column 540 showing thickness (in inches) without paint. As can be seen from thickness columns 538 and 540, the untreated tapes 1 and 2 (and their respective treated counterparts) have less thickness than each of the comparison tapes. A ratio of standout to thickness (without paint) for the treated tape 1 is about 30,000, while the same ratio for treated tape 2 is about 30,444. Meanwhile, the ratio of standout to thickness (without paint) for the comparison tape with the largest standout (i.e., comparison tape 1) is about 27,358. Thus, the increases in standout are clearly not associated with simply increasing the thickness of the blades. Instead, achievement of a ratio of standout to blade thickness of at least 28,000 is achievable by performing surface treatment to the convex side of the blade in accordance with an example embodiment.

As can be appreciated from the data displayed above, surface treatment in accordance with example embodiments provides an improvement in the ratio of standout to width, but provides a very large improvement in the ratio of standout to tape weight and ratio of standout to thickness. No untreated blade could achieve a ratio of standout to tape weight of greater than 250 or a ratio of standout to thickness of greater than 30,000. Accordingly, it should be appreciated that providing surface treatment of an example embodiment enables the provision of a blade that has superior standout with less width and weight. As such, for any given weight and/or width of a blade, providing surface treatment of an example embodiment will dramatically increase standout (i.e., greater than 10% increase). Rather than taking the conventional approaches of improving standout with a wider, thicker and therefore generally heavier blade, standout can instead be achieved merely by providing surface treatments of an example embodiment while maintaining lighter, thinner, and/or narrower blades.

FIG. 7B shows further data relating to the force to collapse an inverted "U" tape shape flat to a table surface. This bend is opposite in direction to that discussed for standout above. In particular, column 550 shows three separate forces needed to collapse the tape at various distances including 1 foot, 6 feet, and at the standout distance.

FIG. 8 illustrates a combination chart 600 showing curve height in a vertical bar chart for each respective measuring tape device shown in FIG. 7. In FIG. 8, collapse force and thickness are each also plotted on a respective one of the bars for each respective measuring tape device. FIG. 9 illustrates a combination chart 610 having the same vertical bar chart of FIG. 8 with thickness also plotted, except that each bar now shows standout instead of collapse force.

FIG. 10 illustrates a chart 700 showing a number of characteristics measured along with a variance of some of those characteristics measured to the treated tape 1 of FIG. 7. The characteristics measured in FIG. 10 can also be seen in the cross section views of the blades shown in FIGS. 13-17. Some noteworthy distinctions may be observed from the data shown in FIG. 10. For example, the width of treated tape 1 at maximum standout is lower than the width of any of the comparison tapes. Treated tape 2 also has a width at maximum standout that is lower than any of the comparison tapes. Meanwhile, height of treated tape 1 at maximum standout is higher than the height of any of the comparison tapes. A width to height ratio (see column 705) of each of the treated tapes is also less than the width to height ratio of each of the comparison tapes. The bottom radius (i.e., the radius of the circular portion of the blade) is shown in column 710. Of note, the bottom radius of each of the treated tapes is less than the bottom radius of each of the comparison tapes. However, it should also be noted that the radius of the curved portion generally stays the same between each of the wings for the comparison tapes, but the radius of the curved portion changes for the treated tapes. As such, column 712 shows the radius of the curved portion of the treated tapes measured as a second location. Additionally, FIG. 10 shows wing length in column 714. As shown in column 714, wing length for each of the treated tapes is significantly shorter than wing length for any of the comparison tapes.

FIG. 11 shows a graph 800 of load on the apex to collapse the blade and vertical displacement on the vertical axis, with respect to time on the horizontal axis. In FIG. 11, curve 802 is for untreated tape 1, curve 804 is for treated tape 1, curve 806 is for untreated tape 2, curve 808 is for treated tape 2, curve 810 is for comparison tape 1, curve 812 is for comparison tape 2, and curve 814 is for comparison tape 3. FIG. 12 illustrates a chart 830 showing standout and collapse force measurements for each of the measuring tape devices mentioned above.

FIGS. 13-17 illustrate cross section views of the blade of each of the measuring tape devices mentioned above at various different points, measured in an unloaded state. In this regard, the first view for each figure is a cross section view taken at a point 12 inches from the distal end of the blade (i.e., from the location of the end hook). The second view for each figure is a cross section view taken at a point 72 inches from the distal end of the blade, and the third view for each figured is a cross section view taken at a point of maximum standout for the corresponding blade (i.e., from FIG. 7A). Meanwhile, for measuring tape devices that include a fourth view, the fourth view represents the view at the point of maximum standout for a treated version of the blade.

Figure 13B:
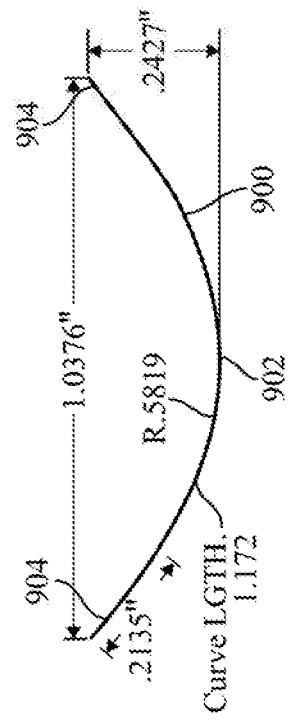
Figure 13D:
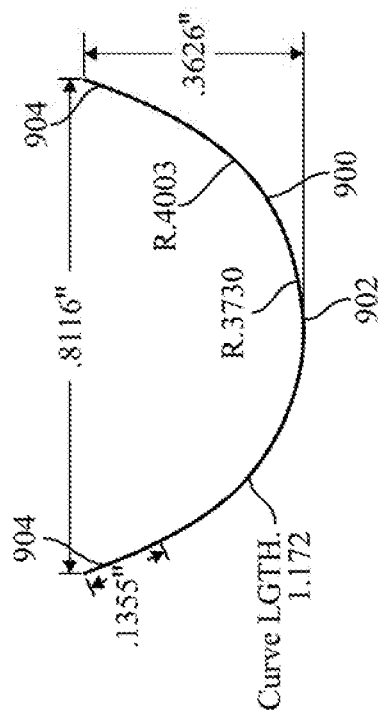
Figure 13A:
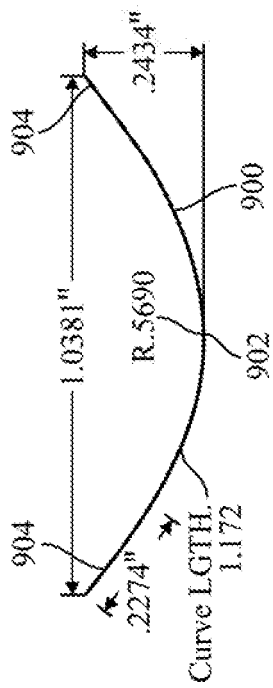
Figure 13C:
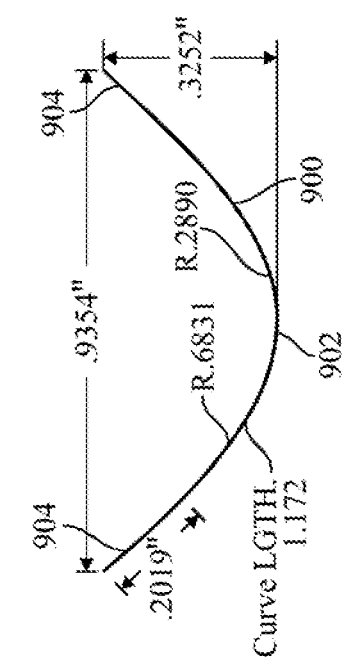

Accordingly, FIG. 13, which is defined by FIGS. 13A, 13B, 13C and 13D, illustrates cross sections for untreated tape 1 (i.e., FIGS. 13A, 13B and 13C) and for treated tape 1 (i.e., FIGS. 13A, 13B and 13D). In this regard, FIG. 13A is cross section view of both treated tape 1 and untreated tape 1 at a location 12 inches from the distal end of the blade. FIG. 13B is a cross section view of both treated tape 1 and untreated tape 1 at a location 72 inches from the distal end of the blade. FIG. 13C illustrates a cross section view of only the untreated tape 1 at the point of maximum standout (i.e., 118.5 inches). FIG. 13D illustrates a cross section view of only the treated tape 1 at the point of maximum standout (i.e., 141 inches). As can be appreciated from FIG. 13A, an angle between the wings 904 and a bisecting line passing through the apex 902 (i.e., a wing angle) is greater than 45 degrees. Meanwhile, the wing angle is substantially less than 45 degrees in FIG. 13D, and is about 30 degrees. The wings 904 may be reduced in size by the application of the surface treatment to the convex side of the blade. Moreover, in some cases, the wings 904 may be masked during the application of the surface treatment to protect a portion of the wings from receiving surface treatment in an effort to control the specific length of the wings 904.

In FIG. 13, a curved portion 900 of the blade includes the apex 902, and has a corresponding radius. The radius decreases from 0.569 inches to 0.5819 inches from the 12 inch location to the 72 inch location. Meanwhile, in the critical region (i.e., at the point of maximum standout of FIG. 13C), the untreated tape 1 begins to demonstrate two different radiuses, with a radius of 0.289 inches near the apex 902, and a radius that increases to 0.6831 inches as the wings 904 are approached. In the critical region for the treated tape 1 (as shown in FIG. 13D), the first radius is larger (i.e., 0.373 inches) than the first radius of FIG. 13C, and the second radius in the curved portion 900 is smaller (i.e., 0.4003 inches) than the second radius of FIG. 13C. Lengths of the wings are also much shorter (i.e., 0.1355 inches) in FIG. 13D than in FIG. 13C. As can be appreciated from FIG. 13D, blade width reduces significantly to 0.8116 inches from 0.9354 inches by virtue of the surface treatment to the convex side of the blade being conducted in the critical region 220. Another notable change caused by the surface treatment of the convex side of the blade is that the ratio of width to height changes substantially. In the critical region (exemplified by FIG. 13D), the ratio of width to height is about 2.24. Meanwhile the ratio of width to height outside the critical region (exemplified by FIG. 13A) is about 4.26. Thus, a reduction in the ratio of width to height of nearly 50% is achievable via providing surface treatment on the convex side of the blade. Meanwhile, the ratio of width to height achievable without such surface treatment is 2.88 (i.e., in FIG. 13C), which is less than 40%.

Figure 14B:
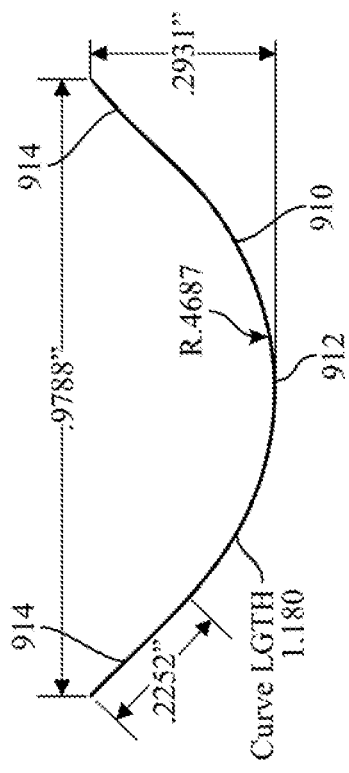
Figure 14D:
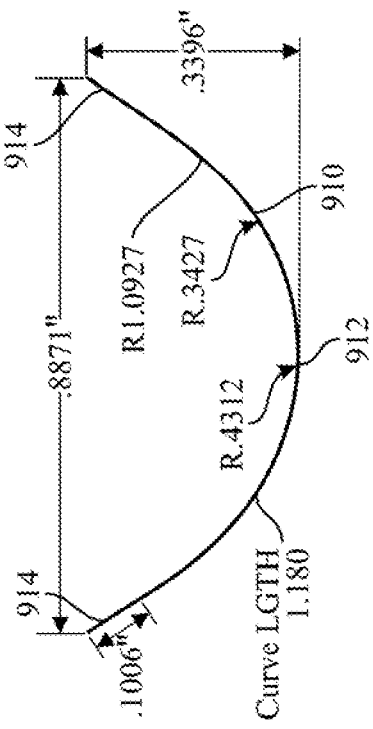
Figure 14A:
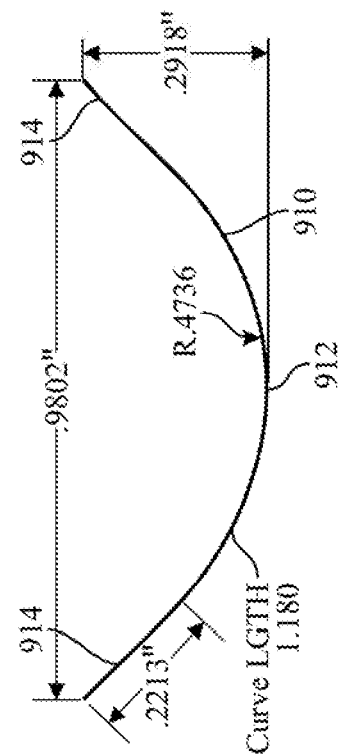
Figure 14C:
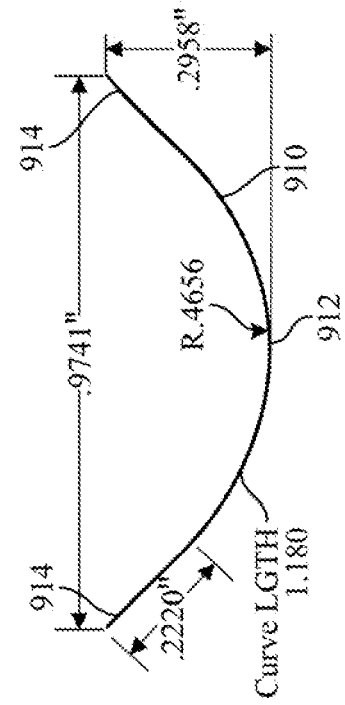

FIG. 14, which is defined by FIGS. 14A, 14B, 14C and 14D, illustrates cross sections for untreated tape 2 (i.e., FIGS. 14A, 14B and 14C) and for treated tape 2 (i.e., FIGS. 14A, 14B and 14D). In this regard, FIG. 14A is cross section view of both treated tape 2 and untreated tape 2 at a location 12 inches from the distal end of the blade. FIG. 14B is a cross section view of both treated tape 2 and untreated tape 2 at a location 72 inches from the distal end of the blade. FIG. 14C illustrates a cross section view of only the untreated tape 2 at the point of maximum standout (i.e., 116 inches). FIG. 14D illustrates a cross section view of only the treated tape 2 at the point of maximum standout (i.e., 137 inches).

In FIG. 14, a curved portion 910 of the blade includes the apex 912, and has a corresponding radius. The radius decreases from 0.4736 inches to 0.4687 inches from the 12 inch location to the 72 inch location. Meanwhile, in the critical region (i.e., at the point of maximum standout of FIG. 14D), the untreated tape 2 begins to demonstrate two different radiuses, with a radius of 0.4312 inches near the apex 912, and a radius that increases to 1.0927 inches as the wings 914 are approached. Lengths of the wings are also much shorter (i.e., 0.1006 inches) in FIG. 14D than in FIG. 14C (i.e., 0.2220 inches). As can be appreciated from FIG. 14D, blade width reduces significantly to 0.8871 inches from 0.9741 inches by virtue of the surface treatment to the convex side of the blade being conducted in the critical region 220.

FIG. 15, which is defined by FIGS. 15A, 15B, and 15C, illustrates cross sections for comparison tape 1. In this regard, FIG. 15A is cross section view of the blade of the comparison tape 1 at a location 12 inches from the distal end of the blade. FIG. 15B is a cross section view of the blade of the comparison tape 1 at a location 72 inches from the distal end of the blade. FIG. 15C illustrates a cross section view of the blade of the comparison tape 1 at the point of maximum standout (i.e., 145 inches). As can be appreciated from FIG. 15C, which shows the smallest angle between the wings 924 and a bisecting line passing through the apex 922 (i.e., the wing angle) that is achievable for any of the comparison tapes, the wing angle is significantly larger than 30 degrees.

In FIG. 15, a curved portion 920 of the blade includes the apex 922, and has a corresponding radius. The radius decreases from 0.6379 inches to 0.5637 inches from the 12 inch location to the 72 inch location, and further decreases to 0.4537 inches at the location of maximum standout (i.e., in the critical region). Of note, even in the critical region, there is only one radius over the entire curved portion 920. Meanwhile, lengths of the wings 924 actually increase from 0.1688 inches at 12 inches (in FIG. 15A) to 0.1822 inches in the critical region (as shown in FIG. 15C). As can be appreciated from FIGS. 15A to 15C, blade width reduces significantly from 1.0915 inches to 1.0458 inches from the 12 inch location to the 72 inch location, and further decreases to 0.9557 inches at the location of maximum standout (i.e., in the critical region). A ratio of width to height in the critical region (i.e., FIG. 15C) is about 2.72 and the same ratio in the non-critical region (e.g., in FIG. 15A) is about 4.09. Thus, a change in the ratios is less than 40%. Accordingly, achieving changes in the ratio of width to height of greater than 40% are achievable by surface treatment of the convex side of the blade, but are not achievable without such treatment.

FIG. 16, which is defined by FIGS. 16A, 16B, and 16C, illustrates cross sections for comparison tape 2. In this regard, FIG. 16A is cross section view of the blade of the comparison tape 2 at a location 12 inches from the distal end of the blade. FIG. 16B is a cross section view of the blade of the comparison tape 2 at a location 72 inches from the distal end of the blade. FIG. 16C illustrates a cross section view of the blade of the comparison tape 2 at the point of maximum standout (i.e., 133 inches).

In FIG. 16, a curved portion 930 of the blade includes the apex 932, and has a corresponding radius. The radius decreases from 0.7820 inches to 0.5968 inches from the 12 inch location to the 72 inch location, and further decreases to 0.4828 inches at the location of maximum standout (i.e., in the critical region). Of note, even in the critical region, there is only one radius over the entire curved portion 930. Meanwhile, lengths of the wings 934 actually increase from 0.1498 inches at 12 inches (in FIG. 16A) to 0.1774 inches in the critical region (as shown in FIG. 16C). As can be appreciated from FIGS. 16A to 16C, blade width reduces significantly from 1.1390 inches to 1.0722 inches from the 12 inch location to the 72 inch location, and further decreases to 0.9853 inches at the location of maximum standout (i.e., in the critical region).

FIG. 17, which is defined by FIGS. 17A, 17B, and 17C, illustrates cross sections for comparison tape 3. In this regard, FIG. 17A is cross section view of the blade of the comparison tape 3 at a location 12 inches from the distal end of the blade. FIG. 17B is a cross section view of the blade of the comparison tape 3 at a location 72 inches from the distal end of the blade. FIG. 17C illustrates a cross section view of the blade of the comparison tape 3 at the point of maximum standout (i.e., 132 inches).

In FIG. 17, a curved portion 940 of the blade includes the apex 942, and has a corresponding radius. The radius decreases from 0.7195 inches to 0.6536 inches from the 12 inch location to the 72 inch location, and further decreases to 0.4983 inches at the location of maximum standout (i.e., in the critical region). Of note, even in the critical region, there is only one radius over the entire curved portion 940. Meanwhile, lengths of the wings 944 decrease slightly from 0.2643 inches at 12 inches (in FIG. 17A) to 0.2464 inches in the critical region (as shown in FIG. 17C). As can be appreciated from FIGS. 17A to 17C, blade width reduces significantly from 1.1551 inches to 1.1292 inches from the 12 inch location to the 72 inch location, and further decreases to 1.0437 inches at the location of maximum standout (i.e., in the critical region).

FIG. 26, which is defined by FIGS. 26A, 26B and 26C, illustrates measurements taken along sample blades in accordance with an example embodiment. In this regard, FIG. 26A illustrates a plurality of test points taken along a length of the blade 991, and a corresponding chord length 993 measured at each respective test point for a first sample blade. A height 995 of the blade from the apex to the distal ends of the lateral sides of the blade (i.e., the ends of the wings) is shown along with the thickness of the blade 997 and the paint thickness 999. FIGS. 26B and 26C illustrate the same parameters measured for respective ones of a second sample blade and a third sample blade.

A number of ways of achieving increased cupping may also be provided. For example, FIGS. 18-21 illustrate some alternative methods by which to achieve cupping. In this regard, FIG. 18, which is defined by FIGS. 18A and 18B, illustrates two implementations for a first way of achieving increased cupping in the critical region by providing stress relief to a convex side of the blade 140 using shot peen cold working in accordance with an example embodiment. FIG. 19 illustrates another way of achieving increased cupping in the critical region by providing stress relief to the convex side of the blade 140 using bead brush cold working in accordance with an example embodiment. FIG. 20 illustrates a still another way of achieving increased cupping in the critical region by providing stress relief to the convex side of the blade 140 using laser etching in accordance with an example embodiment. FIG. 21 illustrates a yet another way of achieving increased cupping in the critical region by providing stress relief to the convex side of the blade 140 using water blasting in accordance with an example embodiment.

The working of the surface of the convex side 240 of the blade 140 in the critical region 220 may be accomplished via a number of different methods. For example, as shown in FIG. 18A, a shot peening assembly 300 may be used to cold work the convex side 240 of the blade 140 (at least in the critical region 220). The shot peening assembly 300 may include a high pressure air line 310 and a shot line 320 that enables shot 322 entering a pressurized air stream from the high pressure air line 310 to be propelled against the surface of the convex side 240 via a nozzle 324. The shot 322 may act like small ball peen hammers plastically deforming the surface of the convex side 240. The convex side 240 may plastically deform while reducing tensile stresses on the surface of the convex side 240 and cup further in the direction shown by arrow 260 in FIG. 5. Thus, the portion of the blade 140 (e.g., the critical region 220) that is cold worked using shot peening by the shot peening assembly 300 may have a greater degree of curvature or cupping than other portions of the blade 140. In some cases, the degree of cupping may be increased by at least 20%. However, more or less cupping can be achieved based on altering the time period over which the shot 322 is propelled against the surface of the convex side 240, the size of the shot 322, the pressure employed in the high pressure air line 310 or other factors. In an example embodiment, the shot 322 could be embodied as sand, metal, plastic, or other rigid materials. Metal may be used in some cases in order to extend the life of the shot 322, and allow for reuse of shot 322. However, plastic materials may be preferred for the shot 322 in other cases. For example, plastic may abrade surfaces less than metal or sand. Thus, in certain instances, such as when the blade 140 is already painted and/or printed, plastic materials may be advantageous for use as the shot 322. In effect, if the production process includes painting and/or printing the blade 140 before peening, then the use of plastic shot may be preferable.

If shot peening is employed in the critical region 220, the shot 322 may bombard the surface of the convex side 240 from a first end of the critical region 220 to a second and opposite end of the critical region 220. However, unlike mechanical bending, the working of the surface using shot peening does not create a prompt jump or distinct change in the degree of cupping at the first and second ends of the critical region 220. Instead, a gradual transition is formed as the material near the first and second ends of the critical region 220 is gradually altered in its curvature from no increased curvature immediately outside the critical region 220 to full increased curvature at points more distant from the edges and within the critical region 220. The lack of a distinct change in cupping makes the blade 140 less susceptible to catching on the aperture 150, and facilitates easier reeling.

The shot peening assembly 300 may include a single nozzle 324, as shown in FIG. 18A. However, the addition of more nozzles may be helpful in improving throughput in some cases. As such, FIG. 18B illustrates a plurality of nozzles 324 and rollers 326 for conveying the blade 140 proximate to the nozzles 324. As can be appreciated from the shot peening assembly 300' of FIG. 18B, increasing the number of nozzles 324 may correspondingly increase throughput for the system. In this regard, for example, more nozzles 324 may enable the provision of an equal amount of peen to a surface over a higher blade feed rate. Thus, the rollers 326 may convey the blade 140 past the nozzles 324 at a higher speed than the shot peening assembly 300 of FIG. 18A, which only has a single nozzle 324. In some cases, the blade 140 may be printed with markers 327 that indicate specific lengths along the blade 140. A photoeye 328 may be provided to detect the markers 327 and control circuitry 329 may operate the nozzles 324 to apply shot 322 over only selected ranges of the blade 140, as determined from the markers 327. In this regard, the markers 327 could directly indicate start and stop points for peening. Alternatively, the markers 327 may be used by the control circuitry 329 to determine the selected range (e.g., the critical region 220) that is to be peened. For example, if the critical range 220 is from 7 feet to 15 feet, the markers 327 could indicate a start point at 7 feet and a stop point at 15 feet. Alternatively, the markers 327 could indicate foot long intervals and the control circuitry 329 could detect the marker indicating 7 feet to start peening and detect the marker indicating 15 feet and stop peening.

In an example embodiment, the control circuitry 329 may be configured to interface with the rollers 326 to control the feed rate and the orientation of the blade 140 relative to the nozzles 324. The feed rate may be controlled based on the portion of the blade 140 that is passing below the nozzles 324. For example, the feed rate may be high from zero to 7 feet, and then slow down from 7 feet to 15 feet for the application of peening. After the 15 foot point, peening may be stopped and the feed rate may again be increased by the control circuitry 329. This variable feed rate control may enable the control circuitry 329 to minimize the overall processing time and machine capacity while maximizing the effectiveness of cupping that is performed by the peening process. An accumulator may be provided on either side of the nozzles 324 to allow control of the feed rate during the treatment of the entire blade 140. Other parameters may also be adjustable or otherwise controlled by the control circuitry 329. For example, the air pressure in the high pressure air line 310 may be increased or decreased responsive to adjustments implemented by the control circuitry 329. Alternatively or additionally, a valve or other control component may be inserted in the shot line 320, and operated by the control circuitry 329, to enable the amount of shot 322 that is fed into the shot line 320 to be controlled. Thus, the material flow rate into the shot line 320 may be controlled by the control circuitry 329.

As an alternative to shot peening, stress relief operations may be performed by cold working using a bead brush assembly 330 as shown in FIG. 19. In this regard, a rotating shaft 332 may be operably coupled to a rim assembly 334 on which a plurality of beads 336 may be mounted in random or predetermined patterns. As the shaft 332 rotates, the rim assembly 334 may carry the beads 336 rapidly about the axis of rotation of the shaft 332 while the beads 336 are allowed to contact a surface of the convex side 240 of the blade 140 (e.g., at least in the critical region 220). The beads 336 may, like the shot 322 in the example above, impact the surface of the convex side 240 and plastically deform the surface to relieve tensile stresses in the surface. This may increase the surface area of the surface of the convex side 240 to increase cupping in a similar manner to that described above (i.e., without creating a distinct transition point).

As yet another alternative, laser etching of the surface of the convex side 240 of the blade 140 may be accomplished using a laser 340 as shown in FIG. 20. In the example of FIG. 20, the laser etching may remove (e.g., by burning, cutting or vaporization) material from the surface of the convex side 240 to relieve residual stresses on the surface. The laser 340 may be used to remove material in any desirable pattern, and certain patterns may result in better stress relief and or better enhancement of cupping than others. Thus, the laser 340 may be programmed to operate under the control of a controller that is configured to remove material in any desirable pattern that achieves the properties (e.g., the degree of cupping) that are desired for the blade 140. As still another alternative, shown in FIG. 21, a water blasting assembly 350 that may use high pressure water to bombard the surface of the convex side 240 to plastically deform and/or remove material to reduce residual stresses on the surface.

The term standout, as applied above, is a generic term describing the extension of a blade out of the housing or casing of a measuring tape device prior to loss of sufficient rigidity to maintain continued standout, at which point collapse and bending of the blade occurs. The phenomenon of collapse, bending or loss of rigidity may therefore happen at a point of breakthrough standout (i.e., a standout at which breakthrough occurs). However, it can be appreciated that the point of breakthrough standout for each blade may depend on the blade construction and treatment, and also based on the manner in which the measuring tape device is held during the extension of the blade to the point of breakthrough standout. As such, standout (or breakthrough standout) for any given blade construction/treatment may actually have a number of different values depending on the measurement method (e.g., how the device is held during extension).

FIGS. 22 to 25 illustrate a number of specifically defined measurement methods and corresponding data gathered for a blade with increased cupping (treated in the critical region as described herein—referred to as "treated CR"), and a number of other blades that are not treated as described herein. The comparison blades will be referred to as Compare 1, Compare 2, Compare 3, and Compare 4. Referring first to FIG. 22, which is defined by FIGS. 22A and 22B, a historical test methodology for determining a breakthrough standout in accordance with an example embodiment is shown. The historical test methodology is defined in reference to FIG. 22A and corresponding measured data is shown in FIG. 22B. FIG. 22A shows a measuring tape device 1000 with blade 1010 extended therefrom through a test rig 1020. The test rig 1020 redirects the blade 1010 at a fixed upward angle until a point of breakthrough standout 1030. Thus, the point of breakthrough standout 1030 of FIG. 22A may be referred to as a historical breakthrough standout. FIG. 22B illustrates average measured values for historical breakthrough standout for the treated CR blade and each of the comparison blades, and demonstrates that the historical breakthrough standout for the treated CR blade at about 12.1 feet.

FIG. 23, which is defined by FIGS. 23A and 23B, shows a droop test methodology for determining a breakthrough standout in accordance with an example embodiment. The droop test methodology is defined in reference to FIG. 23A and corresponding measured data is shown in FIG. 23B. FIG. 23A shows the measuring tape device 1000 being held at a height (A1) with blade 1010 extended therefrom substantially parallel to the ground and allowed to droop. The blade 1010 may extend a distance from the point of origin (B1) to a point of breakthrough standout 1040. Thus, the point of breakthrough standout 1040 of FIG. 23A may be referred to as a droop breakthrough standout. FIG. 23B illustrates average measured values for droop breakthrough standout for the treated CR blade and each of the comparison blades, and demonstrates that the droop breakthrough standout for the treated CR blade at about 13.4 feet.

FIG. 24, which is defined by FIGS. 24A and 24B, shows a utility test methodology for determining a breakthrough standout in accordance with an example embodiment. The utility test methodology is defined in reference to FIG. 24A and corresponding measured data is shown in FIG. 24B. FIG. 24A shows the measuring tape device 1000 being held relatively close to ground level with blade 1010 extended therefrom at a slight upward angle (D3) relative to the ground and allowed to droop toward the ground. The upward angle (D3) is generally increased enough to continue extending the blade 1010 without touching the ground until the breakthrough standout is reached. The blade 1010 may therefore extend a distance from the point of origin (B3) to a point of breakthrough standout 1050. Thus, the point of breakthrough standout 1050 of FIG. 24A may be referred to as a utility breakthrough standout since it resembles the most likely situation encountered under normal usage of the measuring tape device 1000. FIG. 24B illustrates average measured values for utility breakthrough standout for the treated CR blade and each of the comparison blades, and demonstrates that the utility breakthrough standout for the treated CR blade at about 12.3 feet.

FIG. 25, which is defined by FIGS. 25A and 25B, shows a maximum standout test methodology for determining a breakthrough standout in accordance with an example embodiment. The maximum standout test methodology is defined in reference to FIG. 25A and corresponding measured data is shown in FIG. 25B. FIG. 25A shows the measuring tape device 1000 being held with blade 1010 extended therefrom at an upward angle (D2) relative to the ground and allowed to droop toward the ground. The upward angle (D2) is generally increased enough to continue extending the blade 1010 until the largest possible breakthrough standout is reached. The blade 1010 may therefore extend a distance from the point of origin (B2) to a point of maximum breakthrough standout 1060. Thus, the point of maximum breakthrough standout 1060 of FIG. 25A may be referred to as a maximum breakthrough standout since it reflects the largest possible standout of the measuring tape device 1000. FIG. 25B illustrates the case angle required to achieve the maximum breakthrough standout for the treated CR blade and each of the comparison blades. The corresponding maximum standout for each comparison blade is also listed, and therefore FIG. 25B demonstrates that the maximum breakthrough standout for the treated CR blade at about 14 feet, which is a foot longer than any other blade, regardless of angle.

In an example embodiment, a blade for a measuring tape device may be provided. The blade may include a first end configured to extend from a housing of the measuring tape device through an aperture, a second end configured to be wound on a reel assembly within the housing, and a first cupped portion having a first amount of cupping over a selected portion of a longitudinal length of the blade. The first cupped portion may be defined by a curved portion extending from an apex of the curved portion toward lateral edges of the blade, and wings extending from each of the lateral edges toward the curved portion on each side of the apex. The curved portion may include a first radius proximate to the apex of the curved portion, and a second radius at a point spaced apart from the apex on both sides of the apex, the second radius being different than the first radius. Alternatively or additionally, the curved portion may include a first radius proximate to the apex of the curved portion, and a second radius at a point spaced apart from the apex on both sides of the apex, the second radius being different than the first radius In some cases, the above described features/aspects of the blade may be augmented or modified, or additional features/aspects operations may be included. For example, in some cases, a stress relief operation may be applied to the selected portion on only a convex side of the blade to cause the first amount of cupping to be larger than a second amount of cupping provided at a second cupped portion of the blade outside of the first cupped portion. In some cases, the first amount of cupping may be at least 20% greater than the second amount of cupping. In an example embodiment, a transition zone may be defined between the selected portion and the other portions, and wherein an amount of cupping in the transition zone transitions from the first amount of cupping to the second amount of cupping, and wherein the transition zone may be greater than half an inch long. In some cases, a ratio standout to width of the blade may be greater than 116.1. In an example embodiment, a ratio of standout to blade thickness may be at least 28,000. In some cases, a ratio of standout to weight is at least 250. In some cases, the first cupped portion is spaced apart from the first end and the second end of the blade to extend over a critical region of the blade at which maximum standout is expected to occur. A second amount of cupping may be provided at a second cupped portion of the blade outside of the first cupped portion. Lengths of the wings in the first cupped portion may be smaller than a length of wings in the second cupped portion. In an example embodiment, a maximum blade width in the second cupped portion may be at least 20% larger than minimum blade width in the first cupped portion. In some cases, a cross section of the blade may define a parabolic shape extending from the apex toward each respective one of the wings. In an example embodiment, a length of the wings may be less than about 0.14 inches. In some cases, a change in a ratio of width to height between the first cupped portion and the second cupped portion may be greater than about 40%. In some cases, surface roughness on a convex side of the blade in the selected portion may be higher than surface roughness of a concave side of the blade. Alternatively or additionally, surface roughness on a convex side of the blade in the selected portion may be higher than surface roughness of the concave side of the blade outside the selected portion. Alternatively or additionally, surface roughness is substantially constant over a concave side of the blade, and wherein the surface roughness on a convex side of the blade changes along the longitudinal length of the blade.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A blade for a measuring tape device, the blade comprising:
    a first end configured to extend from a housing of the measuring tape device through an aperture;
    a second end configured to be wound on a reel assembly within the housing; and
    a first cupped portion having a first amount of cupping over a selected portion of a longitudinal length of the blade,
    wherein the first cupped portion is defined by a curved portion extending from an apex of the curved portion toward lateral edges of the blade, and wings extending from each of the lateral edges toward the curved portion on each side of the apex, and
    wherein the curved portion includes a first radius proximate to the apex of the curved portion, and a second radius at a point spaced apart from the apex on both sides of the apex, the second radius being different than the first radius,
    wherein the first cupped portion is spaced apart from the first end and the second end of the blade to extend over a critical region of the blade at which maximum standout is expected to occur,
    wherein a second amount of cupping provided at a second cupped portion of the blade outside of the first cupped portion,
    wherein lengths of the wings in the first cupped portion is smaller than a length of wings in the second cupped portion.

2. The blade of claim 1, wherein a maximum blade width in the second cupped portion is at least 20% larger than minimum blade width in the first cupped portion.

3. The blade of claim 1, wherein a cross section of the blade defines a parabolic shape extending from the apex toward each respective one of the wings.

4. The blade of claim 1, wherein a length of the wings is less than about 0.14 inches.

5. The blade of claim 1, wherein a change in a ratio of width to height between the first cupped portion and the second cupped portion is greater than 40%.

6. A measuring tape device comprising:
a housing having an aperture;
a reel assembly; and
a blade, the blade comprising:
a first end configured to extend from the housing through the aperture;
a second end configured to be wound on the reel assembly; and
a first cupped portion having a first amount of cupping over a selected portion of a longitudinal length of the blade,
wherein the first cupped portion is defined by a curved portion extending from an apex of the curved portion toward lateral edges of the blade, and wings extending from each of the lateral edges toward the curved portion on each side of the apex,
wherein the curved portion includes a first radius proximate to the apex of the curved portion, and a second radius at a point spaced apart from the apex on both sides of the apex, the second radius being different than the first radius,
wherein the first cupped portion is spaced apart from the first end and the second end of the blade to extend over a critical region of the blade at which maximum standout is expected to occur,
wherein a second amount of cupping provided at a second cupped portion of the blade outside of the first cupped portion, and
wherein lengths of the wings in the first cupped portion is smaller than a length of wings in the second cupped portion.

7. The device of claim 6, wherein a maximum blade width in the second cupped portion is at least 20% larger than minimum blade width in the first cupped portion.

8. The device of claim 6, wherein a cross section of the blade defines a parabolic shape extending from the apex toward each respective one of the wings.

9. The device of claim 6, wherein a length of the wings is less than about 0.14 inches.

10. The device of claim 6, wherein a change in a ratio of width to height between the first cupped portion and the second cupped portion is greater than 40%.

* * * * *